(12) United States Patent
Torbey et al.

(10) Patent No.: US 11,435,889 B2
(45) Date of Patent: Sep. 6, 2022

(54) SYSTEM AND METHOD FOR BUILDING AND MANAGING USER EXPERIENCE FOR COMPUTER SOFTWARE INTERFACES

(71) Applicant: Genpact Luxembourg S.A.R.L.

(72) Inventors: Frank J. Torbey, Osterville, MA (US); David W. Clark, Brookline, MA (US); Phil H. Goddard, Temecula, CA (US); Karl Steiner, Austin, TX (US)

(73) Assignee: Genpact Luxembourg S.à r.l. II, Luxembourg (LU)

( * ) Notice: Subject to any disclaimer, the term of this patent is extended or adjusted under 35 U.S.C. 154(b) by 0 days.

(21) Appl. No.: 16/542,147

(22) Filed: Aug. 15, 2019

(65) Prior Publication Data
US 2019/0369856 A1 Dec. 5, 2019

Related U.S. Application Data

(60) Continuation of application No. 15/439,389, filed on Feb. 22, 2017, now Pat. No. 10,969,951, which is a division of application No. 13/528,662, filed on Jun. 20, 2012, now Pat. No. 9,606,694.

(60) Provisional application No. 61/499,417, filed on Jun. 21, 2011, provisional application No. 61/499,120, filed on Jun. 20, 2011.

(51) Int. Cl.
| | |
|---|---|
| *G06F 3/04847* | (2022.01) |
| *G06F 3/048* | (2013.01) |
| *G06F 3/0482* | (2013.01) |
| *G06F 3/16* | (2006.01) |

(52) U.S. Cl.
CPC .......... *G06F 3/04847* (2013.01); *G06F 3/048* (2013.01); *G06F 3/0482* (2013.01); *G06F 3/16* (2013.01)

(58) Field of Classification Search
CPC ...... G06F 9/451; G06F 16/20; G06F 16/2246; G06F 16/258; G06F 16/282; G06F 16/284; G06F 16/289
See application file for complete search history.

(56) References Cited

U.S. PATENT DOCUMENTS

| | | | | |
|---|---|---|---|---|
| 5,701,137 | A | * | 12/1997 | Kiernan et al. |
| 7,334,184 | B1 | * | 2/2008 | Simons |
| RE45,371 | E | * | 2/2015 | Simons |
| 2005/0022129 | A1 | * | 1/2005 | Borenstein et al. |
| 2005/0086608 | A1 | * | 4/2005 | Roessler |
| 2005/0147947 | A1 | * | 7/2005 | Cookson, Jr. et al. |
| 2006/0005036 | A1 | * | 1/2006 | Hu et al. |
| 2008/0097849 | A1 | * | 4/2008 | Ramsaier ........... G06Q 30/0274 705/14.67 |
| 2008/0172407 | A1 | * | 7/2008 | Sacks |
| 2010/0004977 | A1 | * | 1/2010 | Marci ................ G06Q 30/0203 705/7.32 |
| 2010/0185517 | A1 | * | 7/2010 | Higgins et al. |

(Continued)

*Primary Examiner* — Justin S Lee
(74) *Attorney, Agent, or Firm* — Goodwin Procter LLP

(57) ABSTRACT

Several computerized tools, methodologies and data structures, according to embodiments of the present invention, are disclosed for collecting data for UX research and development directed to a product, process, and system and for developing personas and scenarios from the data for designing and for measuring the effectiveness of the product, process, and/or systems for use by the personas or real people. The tools, methodologies and data structures may be used individually or in sets.

11 Claims, 34 Drawing Sheets

(56) References Cited

U.S. PATENT DOCUMENTS

2010/0257028 A1* 10/2010 Hillerbrand ............ G06Q 50/01
    705/319
2010/0262631 A1* 10/2010 Andersson et al.
2010/0293057 A1* 11/2010 Haveliwala ........ G06Q 30/0269
    705/14.66
2012/0036197 A1* 2/2012 Bishop
2012/0042263 A1* 2/2012 Rapaport et al.
2012/0158950 A1* 6/2012 Seifert .................... G06F 16/95
    709/224

* cited by examiner

SYSTEM AND METHOD FOR BUILDING AND MANAGING USER EXPERIENCE FOR COMPUTER SOFTWARE INTERFACES

CROSS-REFERENCE TO RELATED APPLICATIONS

This application claims priority to and is a continuation of U.S. patent application Ser. No. 15/439,389, entitled, "System and Method for Building and Managing User Experience for Computer Software Interfaces" filed on Feb. 22, 2017, which is a divisional of U.S. patent application Ser. No. 13/528,662, filed Jun. 20, 2012 now U.S. Pat. No. 9,606,694, issued on Mar. 28, 2017, which claims the benefit of U.S. Provisional Patent Application No. 61/499,120 Jun. 20, 2011, entitled, "Tools for Building and Managing Persona Models for Marketing and for Computer Software Interfaces", and naming Frank J. Torbey, David W. Clark, and Phil H. Goddard as the inventors, and from U.S. Provisional Patent Application No. 61/499,417, filed on Jun. 21, 2011, entitled, "Tools for Building and Managing Persona Models for Marketing and for Computer Software Interfaces" filed on Jun. 20, 2011 and naming Frank J. Torbey, David W. Clark, and Phil H. Goddard as the inventors, the entire contents of each of which are hereby incorporated by reference herein, for all purposes.

TECHNICAL FIELD

The present invention relates to customer and user experience analysis and, more particularly, to computerized tools for building and managing user experience assets.

BACKGROUND ART

"User experience" (UX) is commonly understood to mean a person's perceptions and responses that result from the use or anticipated use of a product, system, or service. UX includes users' emotions, beliefs, preferences, perceptions, physical and psychological responses, behaviors and accomplishments that occur before, during, and after use. UX encompasses all users and stakeholders in the design, development, deployment, and subsequent management and maintenance of a product, system, or service. Three primary factors are commonly considered to influence UX, including: the system, the user, and the context of use. Designers and stakeholders of systems, products, and services have paid particular attention to aspects of UX, including, for example, the system's usability in enhancing the "Customer experience" (CX). "Customer experience" is a subset of UX and focuses on a subset of users who are customers, typically in the stages of considering, buying, or obtaining post-sales customer service and support for the products and/or services offered by an organization. For the purposes of this document, unless stated otherwise, the term UX refers to both "User experience" and "Customer experience."

UX is of interest to organizations that depend on motivating people to perform in desired ways, such as purchasing or using advertised products or services, performing job functions within a management context or voting for or against a promoted candidate or referendum. UX is also of interest to organizations that design computer systems or other devices and products, with which users interact, so that the systems, devices, or products exhibit high usability and efficacy.

Although the motivations of UX have been around for a long time, there is generally a lack of solutions or products in the marketspace to help automate and provide tools to improve the UX development process, including tracking the vast amount of information associated with UX development, as well as the management and maintenance of the UX after deployment. Also, known UX indices are generally qualitative-based rather than quantitative, which are subjectively used by developers and stakeholders in making decisions to modify the system, product, processes, or services in the interest of promoting UX.

SUMMARY OF EMBODIMENTS

An embodiment of the present invention provides a portable interview capture tool for use by an interviewer. The tool includes a first memory, a second memory (which may be the same or different memories), a graphical user interface and a control program. The first memory stores an interview template. The interview template includes a plurality of interview items. Each interview item contains an associated interview question to be potentially asked by the interviewer. The interview template stores information about an order in which at least a subset of the interview items are to be processed during an interview. The second memory is configured to store interview data obtained during the interview. The control program is configured to control the first and second memories and the graphical user interface. The control program is also configured to display, via the graphical user interface, a sequence of the interview questions according to the order in which the at least the subset of the interview items are to be processed. The control program is also configured to receive responses, via the graphical user interface, to ones of the sequence of the interview questions and store the responses as interview data in the second memory.

Each interview item may contain an indication of a type of input control to be displayed by the graphical user interface to receive a response to the interview question associated with the interview item. The input control may be a free-text input control or a multiple-choice input control. The control program may be configured to, in response to a user command received via the graphical user interface, receive, via the graphical user interface, a plurality of text options and alter one of the plurality of interview items that indicates a free-text input control, such that the interview item indicates a multiple-choice input control pre-populated with the received plurality of text options.

The information about the order in which the at least a subset of the interview items are to be processed during an interview may include at least one conditional branch. The branch condition may include at least a portion of a received response to an interview question.

The tool may also include a video input port configured to receive a video signal, such as a still image or a motion video. The control program may be configured to receive the video signal, via the video input port, and store at least a portion of the received video signal as interview data in the second memory in timed correlation with the responses stored in the second memory.

The tool may also include an audio input port. The control program may be configured to receive an audio signal, via the audio input port, and store at least a portion of the received audio signal as interview data in the second memory in timed correlation with the responses stored in the second memory.

The tool may include an audio input port configured to receive an audio signal and an automatic speech recognizer (ASR) configured to recognize speech within the audio signal. The ASR may be configured to provide corresponding recognized speech and a level of confidence in accuracy of the recognized speech. The control program may be configured to display the recognized speech as text on the graphical user interface, such that a display attribute of the text depends on the level of confidence. For example, the display attribute may be color, shade of gray, font, type size, amount or style of underlining, etc. For example, if the display attribute is shade of gray, a darker shade of gray may indicate a higher confidence level.

The control program may be configured to store at least a portion of the recognized speech as at least a portion of a response in the interview data in the second memory. The control program may be configured to store at least a portion of the recognized speech in timed correlation with the responses stored in the second memory.

The control program may be configured to receive a user command, via the graphical user interface. The command delimits a portion of the recognized speech displayed as text. The control program may be configured to store the delimited portion of the recognized speech as at least a portion of a response in the interview data in the second memory.

The control program may be configured to receive, via the graphical user interface, a user input specifying metadata to store the specified metadata, and to associate the stored metadata with the stored portion of the recognized speech, wherein the metadata identifies one of the interview items.

The control program may be configured to receive text entered via a keyboard as at least one of the responses and store the received text as interview data in the second memory. In addition, the control program may be configured to receive, via the graphical user interface, a user input specifying metadata and store the specified metadata and associate the stored metadata with the stored text, wherein the metadata identifies one of the interview items.

The control program may be configured to automatically store metadata and associate the stored metadata with the interview data in the second memory. The metadata includes information about a context in which the responses to the interview questions were received. The metadata may include a date on which the responses were received, an identification of the interviewer and/or an identification of a research project.

The control program may be configured to receive, via the graphical user interface, information about a scenario involving an interviewee and store the received scenario information as interview data in the second memory.

Another embodiment of the present invention provides a computer-implemented method for capturing interview responses. The method includes storing an interview template that includes a plurality of interview items. Each interview item contains an associated interview question to be potentially asked by the interviewer. The interview template stores information about an order in which at least a subset of the interview items are to be processed during an interview. The method also includes displaying, via a graphical user interface, a sequence of the interview questions according to the order in which the at least a subset of the interview items are to be processed. The method also include receiving responses, via the graphical user interface, to ones of the sequence of the interview questions; and storing the responses as interview data in a second memory.

Each interview item may contain an indication of a type of input control to be displayed by the graphical user interface to receive a response to the interview question associated with the interview item. The input control a free-text input control, a multiple-choice input control or another type of control. In response to a user command received via the graphical user interface, a plurality of text options may be received, via the graphical user interface, and one of the plurality of interview items that indicates a free-text input control may be altered, such that the interview item indicates a multiple-choice input control prepopulated with the received plurality of text options.

The information about the order in which the at least a subset of the interview items are to be processed during an interview may include at least one conditional branch, wherein the branch condition includes at least a portion of a received response to an interview question. Displaying the sequence of the interview questions may include conditionally branching according to the order in which the at least the subset of the interview items are to be processed.

The method may also include receiving a video signal and storing at least a portion of the received video signal as interview data in the second memory in timed correlation with the responses stored in the second memory. The method may also include receiving an audio signal and storing at least a portion of the received audio signal as interview data in the second memory in timed correlation with the responses stored in the second memory.

The method may also include automatically recognizing speech within an audio signal and providing corresponding recognized speech and a level of confidence in accuracy of the recognized speech. The recognized speech may be displayed as text on the graphical user interface, such that a display attribute of the text depends on the level of confidence. The method may also include storing at least a portion of the recognized speech as at least a portion of a response in the interview data in the second memory. The method may also include storing at least a portion of the recognized speech in timed correlation with the responses stored in the second memory.

The method may also include receiving a user command, via the graphical user interface. The command may delimit a portion of the recognized speech displayed as text. The delimited portion of the recognized speech may be stored as at least a portion of a response in the interview data in the second memory.

The method may also include receiving, via the graphical user interface, a user input specifying metadata and storing the specified metadata and associating the stored metadata with the stored portion of the recognized speech, wherein the metadata identifies one of the interview items.

The method may also include receiving text entered via a keyboard as at least one of the responses and storing the received text as interview data in the second memory. A user input specifying metadata may be received via the graphical user interface, and The specified metadata may be stored, and the stored metadata may be associated with the stored text. The he metadata may identify one of the interview items.

Metadata may be automatically stored, and the stored metadata may be automatically associated with the interview data in the second memory. The metadata may include information about a context in which the responses to the interview questions were received.

The metadata may include a date on which the responses were received, an identification of the interviewer and/or an identification of a research project.

Optionally, information about a scenario involving an interviewee may be received via the graphical user interface, and the received scenario information may be stored as interview data in the second memory.

Yet another embodiment of the present invention provides a computer program product for providing capturing interview responses. The computer program product includes a non-transitory computer-readable medium having computer readable program code stored thereon. The computer readable program code is configured to store an interview template that includes a plurality of interview items. Each interview item contains an associated interview question to be potentially asked by the interviewer. The interview template stores information about an order in which at least a subset of the interview items are to be processed during an interview. The computer readable program code is configured to display, via a graphical user interface, a sequence of the interview questions according to the order in which the at least a subset of the interview items are to be processed. The computer readable program code is also configured to receive responses, via the graphical user interface, to ones of the sequence of the interview questions and store the responses as interview data in a second memory.

Yet another embodiment of the present invention provides a persona modeler. The persona modeler includes an input configured to receive interview data containing information about a plurality of interviewees. The information about each interviewee includes interview values corresponding to respective responses to a plurality of interview questions. The persona modeler also includes a control program configured to display a plurality of user-adjustable selectors on a graphical user interface. Each selector corresponds to a respective one of the plurality of interview questions. Each selector is adjustable to select a range of values and/or at least one of a predetermined set of values. The control program is also configured to display information about a plurality of the interviewees whose respective interview values match the corresponding selector values. The control program is also configured to calculate a statistical value for each of a plurality of the interview questions. Each statistical value is calculated from the corresponding interview values of the interviewees whose respective interview values match the corresponding selector values. The control program is also configured to display the calculated statistical values.

The control program may be configured to, in response to a user input that changes at least one of the selectors, display information about a plurality of the interviewees whose respective interview values match the corresponding selector values, as changed by the user. In addition, the control program recalculates the statistical value for each of the plurality of the interview questions, such that each statistical value is calculated from the corresponding interview values of the interviewees whose respective interview values match the corresponding selector values, as changed by the user. The control program is also configured to display the recalculated statistical values.

At least a portion of the plurality of interviewees may include fictitious people, and the information about each such fictitious person may be fabricated.

The control program may be configured to automatically identify a range of interview values for each of at least one of the plurality of interview questions, such that the range encompasses an automatically identified group of interview values. For example, the control program may be configured to locate a group of values that are clustered more closely around a given value than other values. For each of the at least one of the plurality of interview questions, the control program is configured to automatically set the corresponding selector to the automatically identified range of interview values.

The control program may be configured to output a persona data set comprising the calculated statistical values. This data set may be in the form of a computer file or all or part of a database.

The interview data may further include metadata describing provenance of the information about the plurality of interviewees. The control program may be further configured to include at least a portion of the metadata in the persona data set. The persona modeler may read interview data from more than one study and merge the interview data. In this case, the persona data set includes provenance information about each study that contributed to the persona, i.e., each study that contributed at least one interviewee who was selected to be in the set of interviewees from which the persona was abstracted.

The control program may be configured to, in response to a user performing a predetermined gesture (such as hovering, as discussed above) on the graphical user interface, proximate where information about an interviewee is displayed, display provenance of information about the interviewee whose information is displayed.

The control program may be configured to receive a user input identifying a corresponding calculated statistical value and a corresponding replacement value. In addition, the control program may be configured to replace the calculated statistical value with the received replacement value and output a persona data set comprising the calculated statistical values, including the replacement value.

The control program may be configured to automatically identify a representative interviewee from among the plurality of interviewees, such that interview values of the representative interviewee match the respective corresponding selector values. In addition, the control program may be configured to display information about the representative interviewee.

The plurality of interviewees may include a plurality of buyers. In this case, the persona modeler may be referred to as a market segment modeler.

Yet another embodiment of the present invention provides a computer-implemented method for facilitating generation of a persona. The method includes receiving interview data containing information about a plurality of interviewees. The information about each interviewee includes interview values corresponding to respective responses to a plurality of interview questions. The method includes displaying a plurality of user-adjustable selectors on a graphical user interface. Each selector corresponds to a respective one of the plurality of interview questions. Each selector is adjustable to select a range of values and/or at least one of a predetermined set of values. The method also includes displaying information about a plurality of the interviewees whose respective interview values match the corresponding selector values, calculating a statistical value for each of a plurality of the interview questions, such that each statistical value is calculated from the corresponding interview values of the interviewees whose respective interview values match the corresponding selector values and displaying the calculated statistical values.

The method may also include, in response to a user input that changes at least one of the selectors, displaying information about a plurality of the interviewees whose respective interview values match the corresponding selector values, as changed by the user. In this case, the statistical value for each of the plurality of the interview questions is recalculated, such that each statistical value is calculated from the corresponding interview values of the interviewees whose respective interview values match the corresponding selector values, as changed by the user. The recalculated statistical values are displayed.

At least a portion of the plurality of interviewees may include fictitious people, and the information about each such fictitious person may be fabricated.

The method may also include automatically identifying a range of interview values for each of at least one of the plurality of interview questions, such that the range encompasses an automatically identified group of interview values. For each of the at least one of the plurality of interview questions, the method may include automatically setting the corresponding selector to the automatically identified range of interview values.

The method may also include outputting a persona data set comprising the calculated statistical values.

The interview data may further include metadata describing provenance of the information about the plurality of interviewees. The method may also involve including at least a portion of the metadata in the persona data set.

The method may also include, in response to a user performing a predetermined gesture on the graphical user interface, displaying provenance of information about an interviewee whose information is displayed proximate where the gesture was performed.

The method may also include receiving a user input identifying a corresponding calculated statistical value and a corresponding replacement value and replacing the calculated statistical value with the received replacement value. In this case, a persona data set that includes the calculated statistical values, including the replacement value, is output.

The method may also include automatically identifying a representative interviewee from among the plurality of interviewees, such that interview values of the representative interviewee match the respective corresponding selector values and displaying information about the representative interviewee.

Yet another embodiment of the present invention provides a computer program product for facilitating generation of a persona. The computer program product includes a non-transitory computer-readable medium having computer readable program code stored thereon. The computer readable program code configured to receive interview data containing information about a plurality of interviewees. The information about each interviewee includes interview values corresponding to respective responses to a plurality of interview questions. The computer readable program code is also configured to display a plurality of user-adjustable selectors on a graphical user interface. Each selector corresponds to a respective one of the plurality of interview questions. Each selector is adjustable to select a range of values and/or at least one of a predetermined set of values. The computer readable program code is also configured to display information about a plurality of the interviewees whose respective interview values match the corresponding selector values and calculate a statistical value for each of a plurality of the interview questions. Each statistical value is calculated from the corresponding interview values of the interviewees whose respective interview values match the corresponding selector values. The computer readable program code is also configured to display the calculated statistical values.

An embodiment of the present invention provides a scenario modeler. The scenario modeler includes an input, a graphical user interface and a control program. The input is configured to receive interview data containing information about a plurality of interviewees. The information about each interviewee includes interview values corresponding to respective responses to a plurality of interview questions. The information about each of at least some of the interviewees includes scenario information. The control program is configured to display the scenario information on the graphical user interface. The control program is also configured to receive, via the graphical user interface, a user input comprising a name of a scenario, receive, via the graphical user interface, a plurality of user inputs that define a plurality of activities to be performed by a hypothetical person and output a scenario data set comprising the name of the scenario and a list of the activities to be performed. A scenario data set may be, for example, in the form of a disk file or a part of all of a database.

Another embodiment of the present invention provides a computer-implemented method for generating a scenario. The method includes receiving interview data containing information about a plurality of interviewees. The information about each interviewee includes interview values corresponding to respective responses to a plurality of interview questions. The information about each of at least some of the interviewees includes scenario information. The method includes displaying the scenario information on a graphical user interface, receiving, via the graphical user interface, a user input comprising a name of a scenario, receiving, via the graphical user interface, a plurality of user inputs that define a plurality of activities to be performed by a hypothetical person and outputting a scenario data set comprising the name of the scenario and a list of the activities to be performed.

Yet another embodiment of the present invention provides a computer program product for generating a scenario. The computer program product includes a non-transitory computer-readable medium having computer readable program code stored thereon. The computer readable program code is configured to receive interview data containing information about a plurality of interviewees. The information about each interviewee includes interview values corresponding to respective responses to a plurality of interview questions. The information about each of at least some of the interviewees includes scenario information. The computer readable program code is also configured to display the scenario information on a graphical user interface, receive, via the graphical user interface, a user input comprising a name of a scenario, receive, via the graphical user interface, a plurality of user inputs that define a plurality of activities to be performed by a hypothetical person and output a scenario data set comprising the name of the scenario and a list of the activities to be performed.

An embodiment of the present invention provides a collaboration tool, The collaboration tool includes a memory configured to store a plurality of nodes of a tree. The tree represents a user interface of a computer application. Each node corresponds to a respective portion of the user interface. The memory may, but need not, be persistent. Persistent means the memory maintains its contents even after a computer program that was accessing the memory exits. A disk file and a database are examples of persistent memories. The collaboration tool also includes a control program configured to control the memory and receive a user input that describes a new portion that is to be added to the user interface. The control program is also configured to insert a node in the tree corresponding to the new portion, receive a user input that identifies a persona and a portion of the user interface and store an identification of the persona in the memory and associate the stored persona identification with the node that corresponds to the identified portion of the user interface.

The collaboration tool may also include a port configured to access a persona database that includes provenance data associated with at least one persona represented in the persona database. The control program may be configured to read, from the persona database, via the port, provenance data associated with a persona that is associated with a node in the tree. The control program may also be configured to store the read provenance data in the memory and associate the stored provenance data with the node in the tree. In addition, the control program may be configured to, in response to a user performing a predetermined gesture on a graphical user interface of the collaboration tool, proximate where information about a node of the tree is displayed, display provenance of information about a persona associated with the node whose information is displayed.

The control program may also be configured to receive a user input that identifies a scenario and a portion of the user interface and store an identification of the scenario in the memory and associate the stored scenario identification with the node that corresponds with the identified portion of the user interface.

The control program may also be configured to receive a user input that includes a comment and that identifies a portion of the user interface and store the comment in the memory and associate the stored comment with the node that corresponds with the identified portion of the user interface. The comment may, for example, describe a usability problem identified early in the design phase of a computer application, such as during usability testing or by reviewers of wireframe designs.

Yet another embodiment of the present invention provides a computer-implemented method for facilitating collaboration among a plurality of user interface designers. The method includes accessing a persona database that includes provenance data associated with at least one persona represented in the persona database. The method also includes reading, from the persona database, provenance data associated with a persona that is associated with a node in the tree. The read provenance data is stored in a memory, and the stored provenance data is associated with the node in the tree. In response to a user performing a predetermined gesture on a graphical user interface of a collaboration tool, proximate where information about a node of the tree is displayed, the method includes displaying provenance of information about a persona associated with the node whose information is displayed.

The method may also include receiving a user input that identifies a scenario and a portion of the user interface and storing an identification of the scenario in the memory and associating the stored scenario identification with the node that corresponds with the identified portion of the user interface.

The method may also include receiving a user input that includes a comment and that identifies a portion of the user interface and storing the comment in the memory and associating the stored comment with the node that corresponds with the identified portion of the user interface.

Yet another embodiment of the present invention includes a computer program product for facilitating collaboration among a plurality of user interface designers. The computer program product includes a non-transitory computer-readable medium having computer readable program code stored thereon. The computer readable program code is configured to access a persona database that includes provenance data associated with at least one persona represented in the persona database. The computer readable program code is also configured to read, from the persona database, provenance data associated with a persona that is associated with a node in the tree. The computer readable program code is also configured to store the read provenance data in a memory and associating the stored provenance data with the node in the tree. The computer readable program code is also configured to, in response to a user performing a predetermined gesture on a graphical user interface of a collaboration tool, proximate where information about a node of the tree is displayed, displaying provenance of information about a persona associated with the node whose information is displayed.

An embodiment of the present invention provides a computer application usability reporting utility. The utility includes a memory, a port and a control program. The memory is configured to store a plurality of nodes of a tree. The tree represents a user interface of the computer application. Each node corresponds to a respective portion of the user interface. Each node is associated with a unique identification of the respective portion of the user interface, and each node includes a counter. The port is configured to receive electronic usability problem reports. Each such report includes an identification of a portion of the user interface on which a usability problem has been automatically detected. The control program is configured to control the memory and the port. The control program is configured to, in response to receiving a usability problem report via the port, locate the node in the tree that corresponds to the portion of the user interface identified by the identification in the usability report and increment the counter in the node.

Optionally, the memory is configured to store information about a persona in association with each node of the tree, and the control program is configured to, in response to receiving a user input identifying a persona, display information about content of the counter of a node associated with the identified persona.

Optionally, the memory is configured to store information about a persona in association with each node of the tree, and the control program is configured to, in response to receiving a user input identifying a persona, display information about contents of the counters of all nodes associated with the identified persona.

Optionally, the port is configured to receive electronic usability problem reports from a plurality of disparate sources, and the counter in each node reflects a total number of usability problem reports received from the plurality of disparate sources.

Another embodiment of the present invention provides a computer-implemented method for reporting on computer application usability. The method includes storing a plurality of nodes of a tree. The tree represents a user interface of the computer application. Each node corresponds to a respective portion of the user interface. Each node is associated with a unique identification of the respective portion of the user interface and each node includes a counter. The unique identification of the respective portion of the user interface may be, for example, a web page ID. The method also includes receiving an electronic usability problem report. The report includes an identification of a portion of the user interface on which a usability problem has been automatically detected. In response to receiving the usability problem report, the method includes automatically locating the node in the tree that corresponds to the portion of the user interface identified by the identification in the usability report and incrementing the counter in the node.

The method may include storing information about a persona in association with each node of the tree and, in response to receiving a user input identifying a persona, displaying information about content of the counter of a node associated with the identified persona. The method may also include storing information about a persona in association with each node of the tree and, in response to receiving a user input identifying a persona, displaying information about contents of the counters of all nodes associated with the identified persona.

The method may also include receiving electronic usability problem reports from a plurality of disparate sources. The counter in each node may reflect a total number of usability problem reports received from the plurality of disparate sources.

BRIEF DESCRIPTION OF THE DRAWINGS

The foregoing features of embodiments will be more readily understood by reference to the following detailed description, taken with reference the accompanying drawings, in which:

FIGS. 9A and 9B schematically show graphical user interfaces of the personal modeler according to an aspect of an embodiment.

FIG. 9C schematically shows another aspect of the graphical user interface to generate a baseline persona according to an aspect of an embodiment.

FIG. 9E schematically shows yet another aspect of the graphical user interface to generate a baseline persona according to an aspect of an embodiment.

FIG. 9H schematically shows a response of the persona modeler resulting from a user's predetermined gesture on the graphical user interface according to an aspect of an embodiment.

FIG. 9J schematically shows a one-sheet summary output of the persona modeler according to an aspect of an embodiment.

FIG. 11 schematically shows a scenario scorecard worksheet according to an aspect of the embodiment.

DETAILED DESCRIPTION OF SPECIFIC EMBODIMENTS

Several tools, methodologies and data structures, according to embodiments of the present invention, are disclosed for developing, evaluating, and managing UX across the UX life cycle. The tools, methodologies and data structures collect data for UX research and use the collected data to develop personas and scenarios for measuring effectiveness of systems, processes, and products, with respect to use by the personas or real people.

Personas are generally considered to be data models that represent types of humans that are targets of the system or product (such as end-users or purchasing decision makers), advertising campaign, etc. of interest in a project. A persona represents a fictitious person with a defined set of characteristic attributes. A persona is defined to identify a type of person who is targeted, and then the persona is used to inform decision making for other stages of a project, such as user interface design, documentation preparation, help desk design, advertising, and merchandising (layout of merchandise within a store or on a merchant web site), among others. For example, if the personas are developed to support the design of an e-commerce web site that will sell women's clothing, one or more shopper personas may be targeted for development. Exemplary traveler personas may include a "busy business person," "family vacation traveler," "surfer dude," "spring break student" and "honeymooner." In another example, in past presidential elections, a type of voter may have been referred to as a "soccer mom" as a shorthand description for a (possibly long) list of characteristics. In other examples, personas may be used for training supervisors by representing people who the supervisors will manage, or for representing types of employees that a human resources department might attempt to recruit. Thus, in some cases, multiple personas are created for a single product, advertising campaign or other use.

Figure 1:
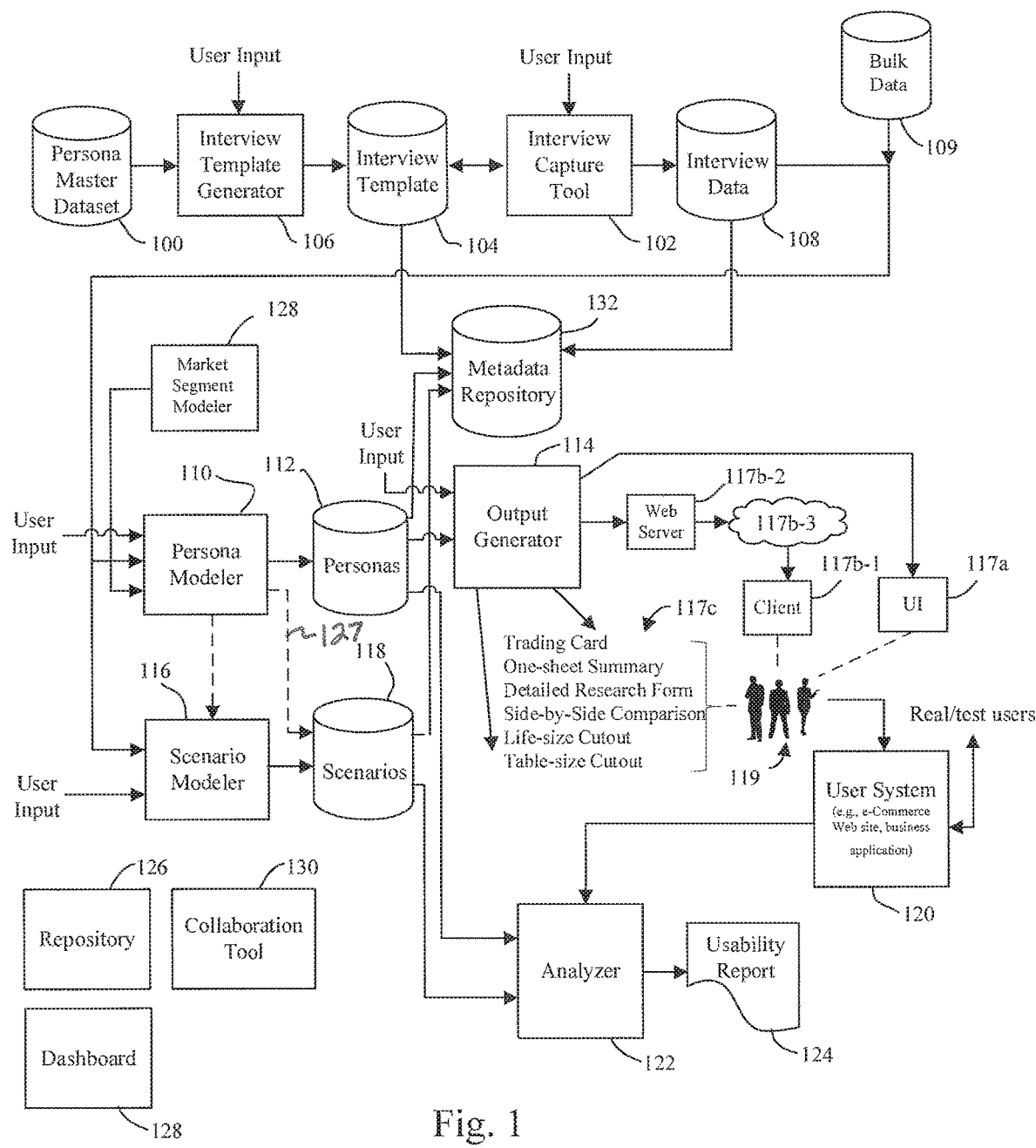
FIG. 1 is a schematic block diagram illustrating aspects of the present invention and how can they be used together.
Figure 2A:
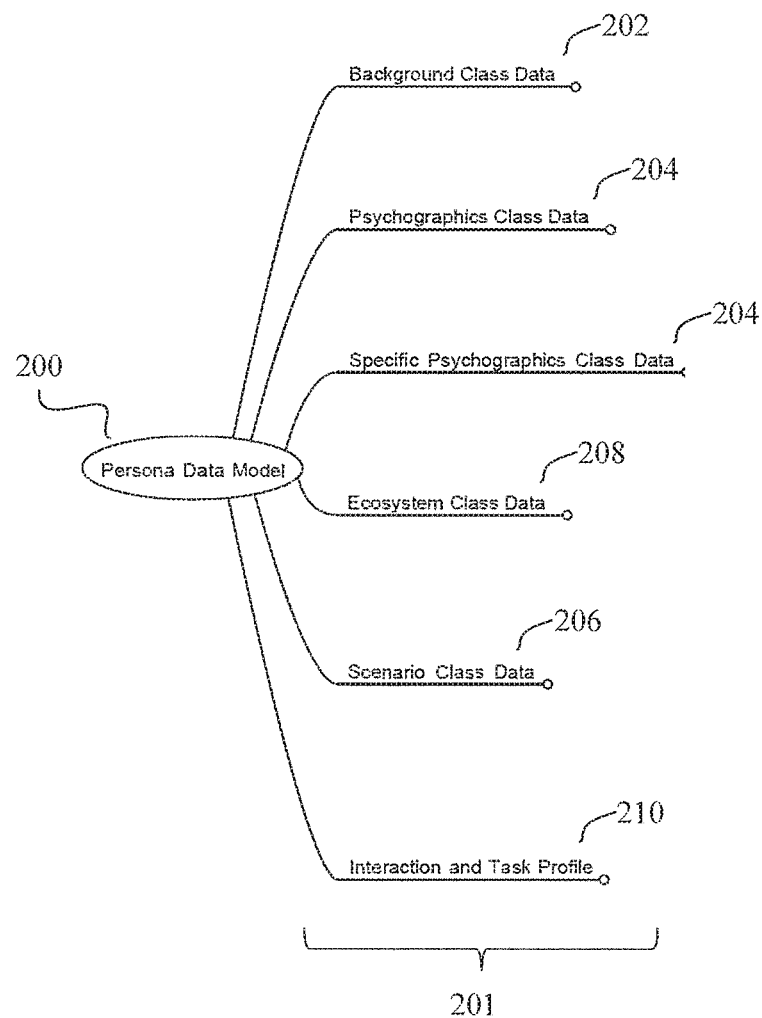
FIGS. 2A-G schematically illustrate an exemplary list of data items in a persona data model.
Figure 2B:
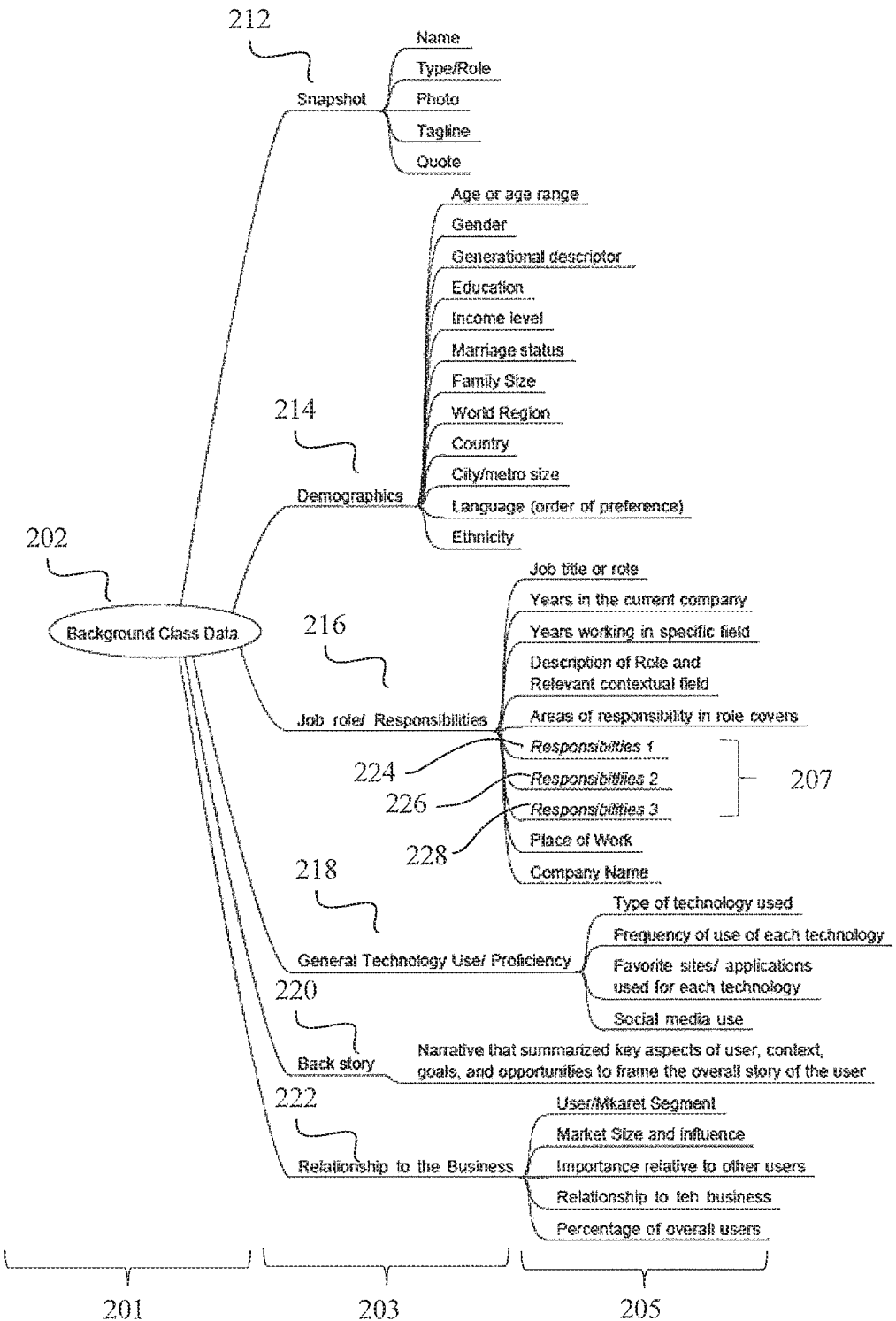
Figure 2C:
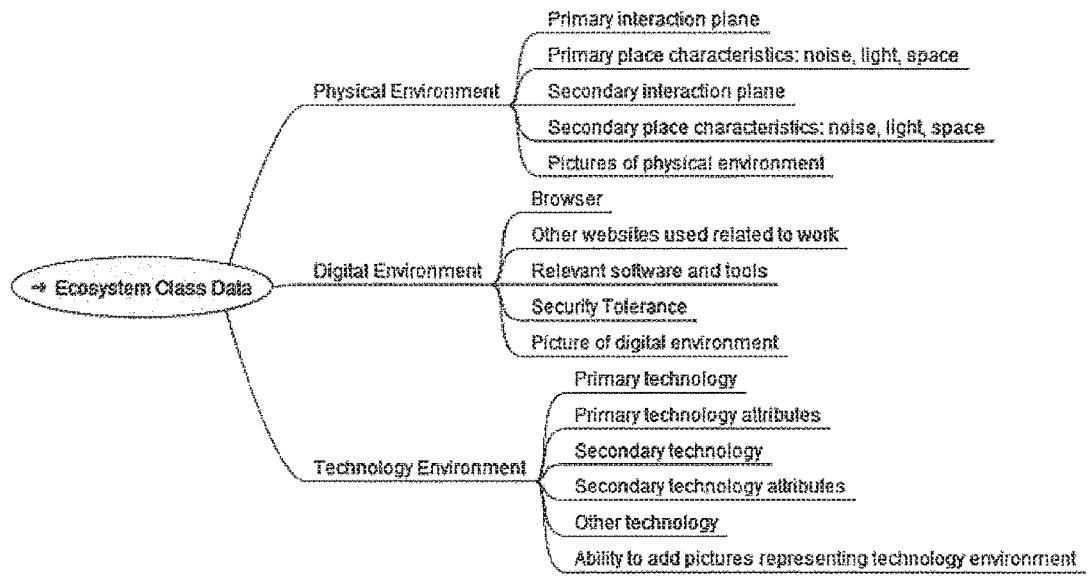
Figure 2D:
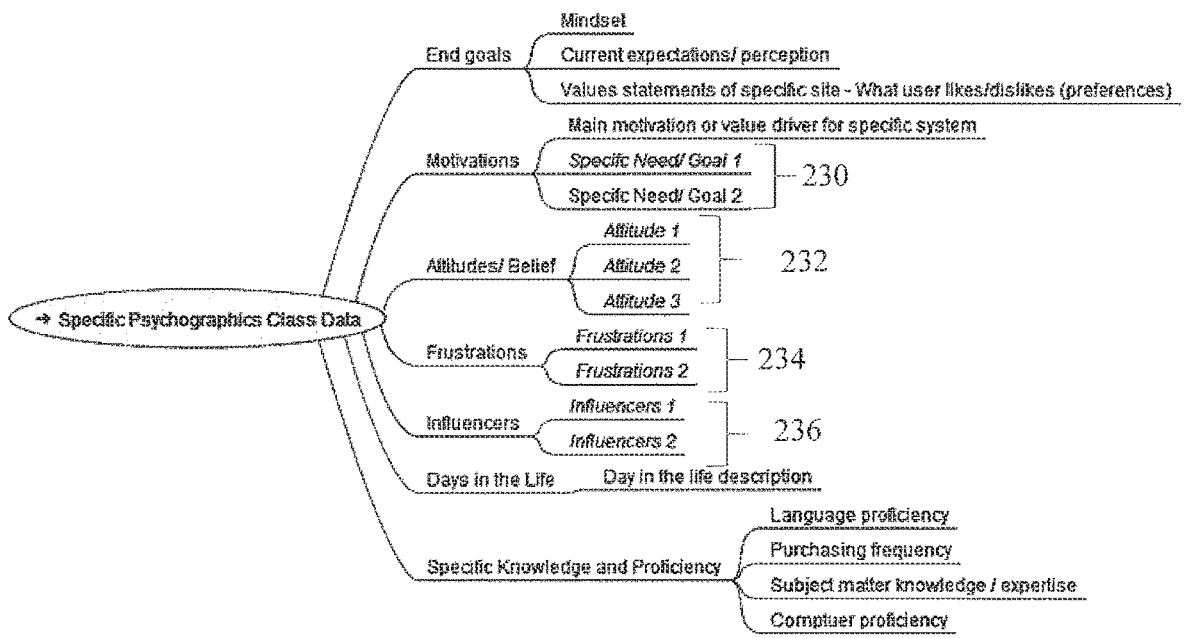
Figure 2E:
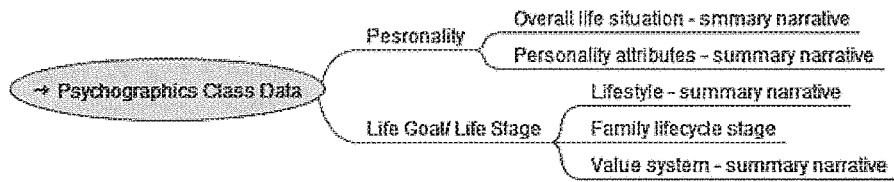
Figure 2F:
Figure 2G:
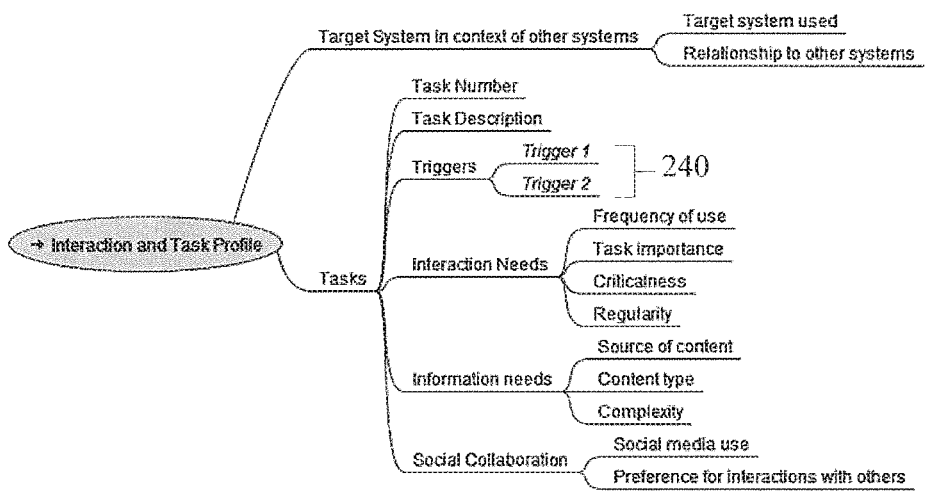

FIG. 1 is a schematic block diagram illustrating main components of the present invention and how they interact and can be used together. These components and interactions are described briefly here and then in more detail in subsequent sections. The main components may work individually or in combination to provide tools for UX development and management.

A persona master data set 100 includes definition of hierarchically organized data items that may be used to define personas. As indicated, a persona is a data model that represents a fictitious person who is a target of a system, product, or campaign (e.g., an end-user of an e-commerce web site). The data model contains descriptions of various attributes of the fictitious person, such as the person's age, gender and education level. Persona data may be numerical (e.g., age), textual (e.g., job title), narrative in form (e.g., a summary of the person's personality or a description of the person's attitudes and/or beliefs with respect to a given subject), or defined by metrics (e.g., psychometric test based on psychological preferences, perception of the environment, decision-making affinity—one such psychometric test includes the Myers-Briggs Type Indicator (MBTI) assessment).

FIGS. 2A-G schematically illustrates an exemplary list of data items in a persona data model 100 (FIG. 1). The list of data items may be grouped or indexed by categories 201 and sub-categories 202. The categories 201 may be categorized by background information 202, psychographic information 204, ecosystem information 206, scenario information 208, and interaction and task information 210. The background information category 202 and the other categories may be subcategorized further, for example, by snapshot information 212, demographic information 214, job role and responsibilities 216, technology proficiency 218, back story 220, and relationship to the business 222.

Persona data may be numerical, textual, narrative, or defined by a metric. Once populated with data, data items 205 of the same definitions may be analyzed in relation to each other and in relation to the same definitions of various other researched subjects (i.e., people).

Data items 205 may include groups, in which each group consists of data items of the same definition class. For example, a person may have several job role or responsibilities.

Generally, many aspects of persona development and UX study are subjective. Therefore, developing and using personas and, in general, the field of UX has been treated more as an art form than a science or field of engineering, yielding results that are often less accurate and less useful than had been anticipated or hoped for. However, by employing consistent data models housed in an electronic repository, a more reliable and consistent process may be developed that facilitates objective analysis. For example, although the persona development may itself be subjective, in comparing similarly-derived personas generated from the same framework, an objective comparison may be derive in comparing such personas.

Returning to FIG. 1, a first set of tools facilitates creating personas and scenario for early stages of a design activity. These first set of tools provides a framework by defining the goal or requirement based upon personas and scenarios. The tools may generate outputs and reports that are then used by designers and stakeholders in designing the systems, processes, and products. A second set of tools provides a framework to evaluate the work-piece (i.e., the system, process, and product) with reference to the defined persona and scenario. The first set of tools may then use the evaluation to further refine the generated personas and scenario as a continuing and on-going cycle.

In general, a persona describes who performs an activity, and a scenario describes what the persona does, where the persona performs the activities, and under what circumstances. For example, a "busy business person" persona may wish to schedule a "one-day opposite coast business trip." The requirements may include, for example, use of a corporate credit card, a rental car at the destination airport, three flight options from which the persona can choose and willingness to take a "red-eye" flight. In addition to the base activity or activities of the scenario and the requirements, the scenario defines the persona's emotional context and environmental contexts for the activities. The emotional context defines the persona's psychological state of mind, such as level of stress, patience and concern over cost. The environmental context describes where the activities take place. For example, a persona may research flight options at home, using a computer to access various travel service provider web sites, or the persona may do the same in an office setting. Other scenarios may involve delegating the task to an administrative assistant or visiting a travel agent.

A third set of tools represents tools that are employed in the first and second toolset to address the large amount of data associated with UX research and development and providing an efficient mechanism of presenting the information to the various designers and stakeholders. The first and second set of tools may be further categorized as collecting the information, analyzing and modeling, and reporting. It should be apparent to those skilled in the art that the various individual tools (to be described in further details) and elements thereof may be employed in combination with other tools within the same toolset, or with other toolsets. It should also be apparent to those skilled in the art that segmentation of the various tools into sets are merely illustrative and that various other means of segmenting the toolsets or functions thereof are within the scope of this disclosure.

The first set of tools illustratively includes an interview capture tool 102, an interview template generator 106, a persona modeler 110, an output generator 114, and a scenario modeler 116. In alternate embodiments, the first set of tools may further include a markets segment modeler 128. The first set of tools provides personas, scenarios, and derivative reports and requirements to designers and stakeholders 119 of a system, process, and product 120 (referred to as a "user system" in FIG. 1).

The derivative reports and requirements may be presented to designers and stakeholders 119 in various forms, including through a user-interface (UI) 117a (such as a UI in a stand-alone/portable computer or mobile device), a client portal 117b-1 delivered from a web server 117b-2 across a network 117b-3, and a series of design props 117c (e.g., trading cards, one-sheet summary, detailed research form, side-by-side comparison report, life-size cutout, and table-size cutouts). It is noted that the user-interface 117a and the client portal 117b-1 may deliver similar content as the design prop 117c to the designers and stakeholders 119, but merely in digital form. The various tools and functions of the first set of tools are now descried in further detail.

An interview capture tool 102 is an interactive hardware/software tool that facilitates interviewing real people who are targeted users of a system, product, or advertising campaign to acquire data about their activities, motivations, needs, and desires to facilitate generating one or more personas and, optionally, one or more scenarios. An interview template generator 106 is an interactive software tool configured to copy a subset of the definitions from the persona master data set 100 into the interview templates 104. The interview capture tool 102 is used by interviewers to interview people who may be in the target audience. Information obtained by the interviewers is stored by the interview capture tool 102 in an interview data database 108. Definitions of the data types to be captured are stored in one or more interview templates 104.

A persona modeler 110 is an interactive software tool that that reads interview data 108 and facilitates generation of personas 112. The persona modeler 110 accepts user inputs (e.g., age, gender, etc.) to define a persona 112. The persona modeler 110 may automate aspects of the persona generation process. The persona modeler 110 may also provide data analysis and decision support tools that a human user uses to analyze the interview data 108 and, as a result, partition the interviewees into groups of people having similar characteristics ("clusters"). An output generator 114 generates content (stored in the persona database 112) having personas, scenarios, and derivative reports and requirements to designers and stakeholders 119 of a system, process, and product 120.

A scenario generator 116 is an interactive software tool that facilitates generation of scenarios 118. The scenarios 118 may be completely defined by user input, or aspects of the scenarios 118 may be obtained from the interview data 108.

The second set of tools provides feedback, comments on usability, user's experience for the user system 120 in the context of the personas, scenarios from which the use system is, in part or whole, defined. The second set of tools illustratively includes an analyzer/report generator 122. If the user-system is an interactive system (e.g., an e-commerce web site 120), the analyzer 122 analyzes the user system 120 to generate scores that may represent usability of the system 120 by the personas 112 that are anticipated to use the system, and for performing the anticipated scenarios 118. In addition, designers and stakeholders 119 may instrument the user system 120 to gather user interaction data while the system is used by real or test users, and this data may be compared by the analyzer 122 to anticipated interactions, based on the personas 112 and the scenarios 118. The analyzer 122 may generate a usability report 124 that indicates the extent to which actual or test uses of the system match uses anticipated by the scenarios 118 and uses by the kinds of people represented by the personas 112.

The third set of tools illustratively includes a repository 126 for data collected and generated by the first and second set of tools (includes data and metadata 132), a dashboard function 128 to present the vast amount of individually and aggregated data of each tool to the user, and a collaboration tool 130 that provide a framework to manage the data and its provenance of the data.

The repository 126 supports the storage of all assets created with the modeling tools (e.g., template data, researched data, analytics data, tool's work products, etc.). The collaboration tool 130 allows a team of people (e.g., designers and stakeholders 119) to collaborate on the design and development of software applications. The collaboration tool 130 may hierarchically store the data to node (i.e., logical or functional representation of the work-piece product, system or service 120). The nodes have identified personas and scenario associated to each given node, thereby allowing for comments or acquired information directed at the node to be reference back to the originating personas or scenario that gave rise to the requirements for that node.

Each of the tool set of the first tool set, the second tool set, and the third tool set are not described. Although discussed separately, it should be apparent to those skilled in the art that the various functions may be combined, in part or in whole.

Interview Templates

As noted, interview templates 104 may be generated or pre-defined for various types of expected uses. For example, if UX research is expected to be performed in the financial services sector, interview templates may be generated or pre-defined for several "vertical" subsectors, such as retail banking, commercial banking, investment banking and financial advising. Within each of these vertical subsectors, interview templates may be generated or pre-defined for various anticipated groups of people, such as consumers, customer service representatives, loan officers and traders.

In the illustrative embodiment, the interview template may comprise, in part, of interview items, which may include a set of interview and research questions to be potentially asked by an interviewer/researcher to an interviewee/subject during the course of an interview. Similarly, the term interviewer, as now used in the specification, also refers to researchers. An interview generally refers to an event designed to solicit responses from an interviewee or subject. The term interview also encompasses both interview-like and research-like activities in the pursuit of information (e.g., market, organizational, etc.). Generally, an interview item may contain only a single set of associated interview or research questions. However, in alternative embodiments, a single interview item may constitute a portion of or multiple of whole or partial sets of interview or research questions.

The interview and research questions may be generated by an expert in the area or may be a previously developed set of interview and research questions that has been used in past interview and research activities. Questions generally are interrogatory statement, actions, non-verbal cues (i.e., gestures), and any statements that may elicit a response. Question may also include multimedia content, such as video or audio, which also elicits a response. The response may include verbal and non-verbal communication, gestures, tone, facial expression, action, and non-verbal cues such as silence for which information may be derived. Designers and stakeholders 119 or persons acting on behalf or in service of the designers (e.g., consultants, contractors, or service providers) may use the interview templates as starting points and as guide posts to develop additional interview and research questions specific to the intended goal of the user system 120.

The interview templates may be indexed by categories (e.g., goals, persona, and scenario) as well as the interview information, such as date, interviewee, interviewer, etc. The indexing allows for categorical searching, faceted searching, and keyword searching of the template data. Elemental data of an interview data (e.g., the list of questions) within the interview template may also be indexed.

The interview template may be used in conjunction with an editor. The editor displays a portion of the interview template based upon a defined category: goals, persona, and/or scenario. The editor displays the list of questions as individual elements that may be selected or remove from the present project. The editor may further display or highlight the alternative branching of the questions as a result of the response of the interviewee.

As noted, the interview template 104 may be used by the interview capture tool 102 to guide the interviewer and/or researchers by displaying questions on the display screen 302. Based on information entered by the interviewer, such as based on responses by the interviewee, the template may branch. That is, portions of the interview template may be skipped. For example, based on the interviewee's reported gender, job responsibility, marital status or other factor or combination of factors, predefined portions of the interview template may be skipped. As another example, if an interviewee is not married, questions about the interviewee's spouse may be skipped.

Figure 21A:
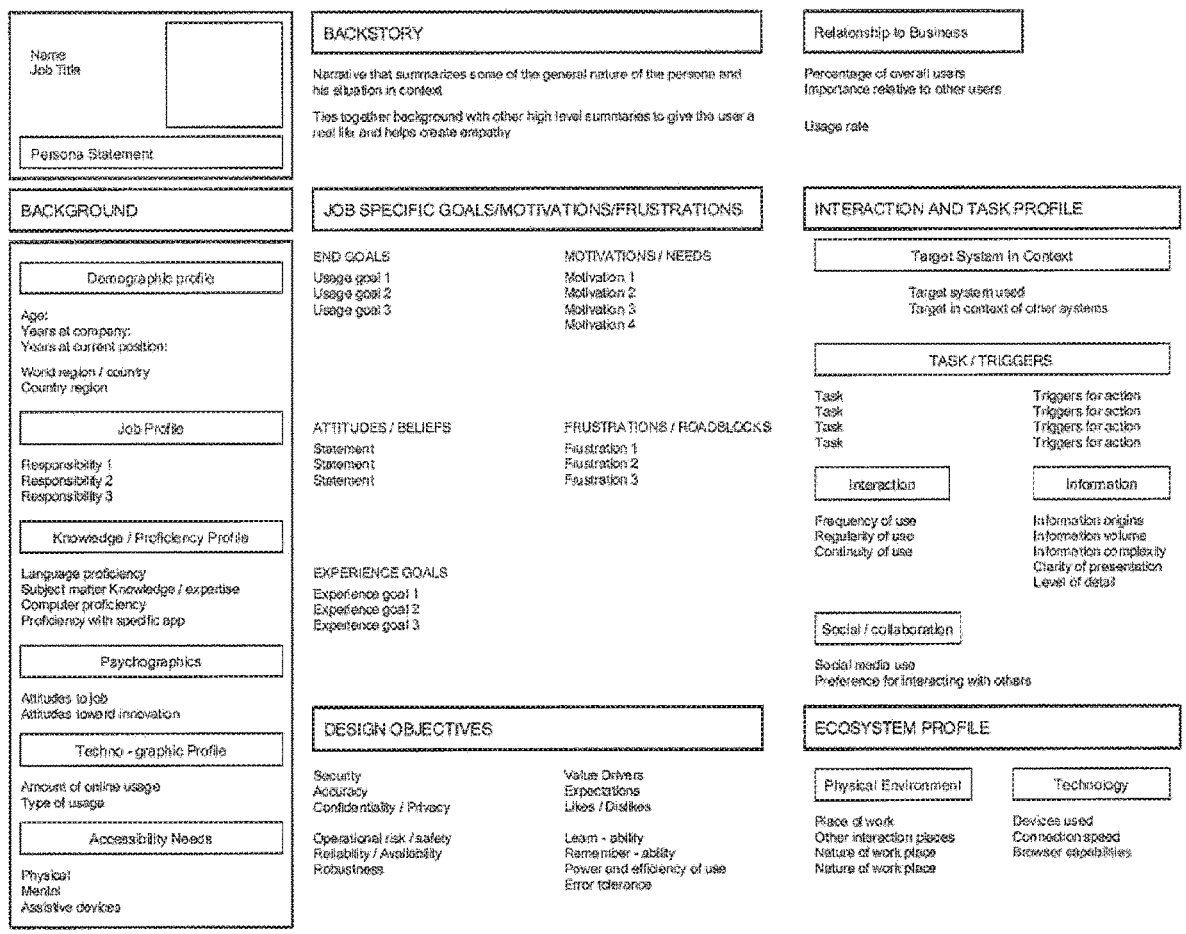
FIGS. 21A, 21B, and 21C show exemplary interview templates of an alternative embodiment of the interview template.
Figure 21B:
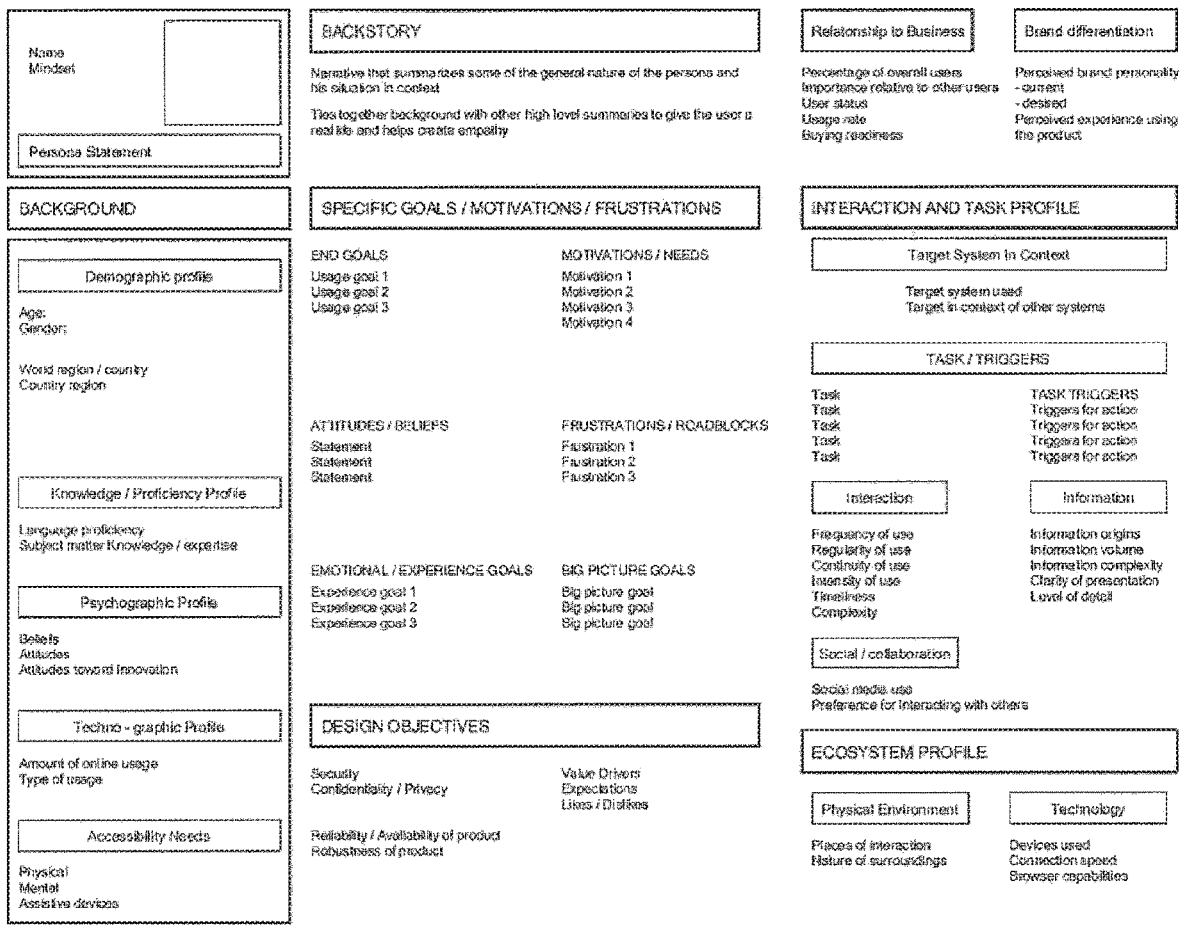
Figure 21C:
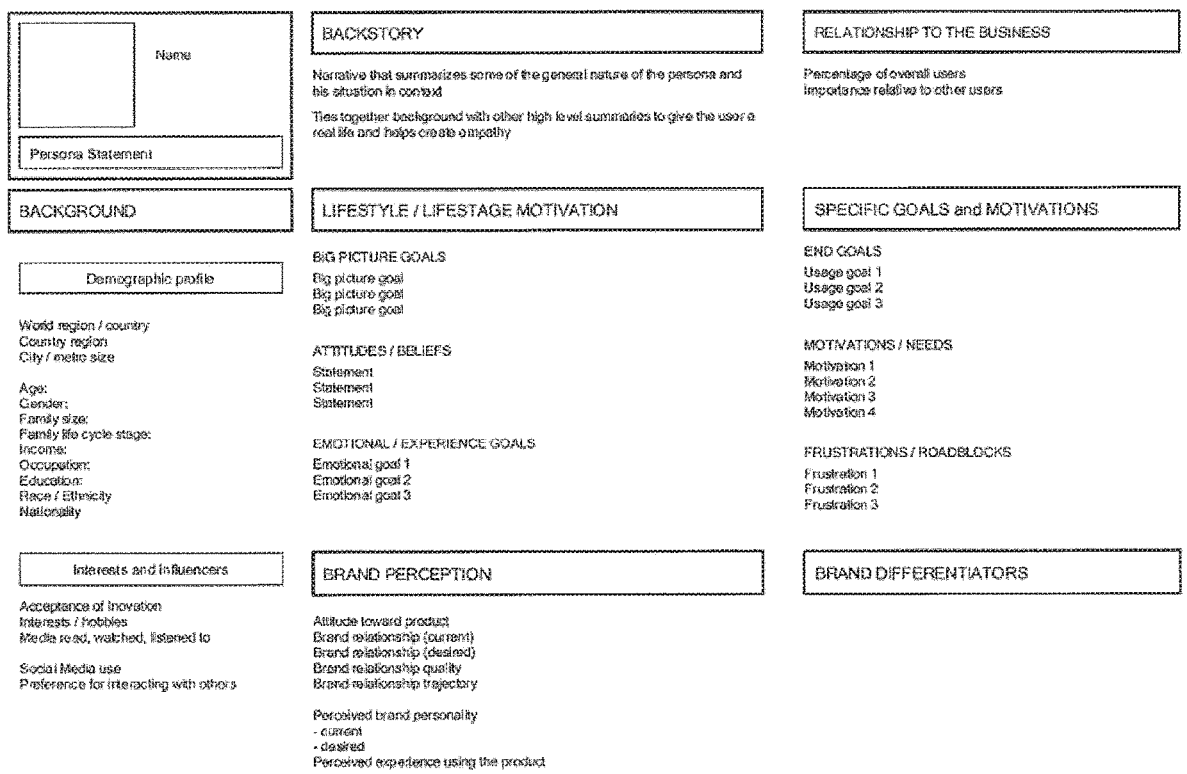

In alternative embodiment, interview template 104 may be represented as a worksheet having data fields to elicit specific information. Exemplary interview templates of the alternative embodiment are provided in FIGS. 21A, 21B, and 21C. These exemplary interview templates are specifically tailored to elicit responses that may be derived into information relating to personas and scenarios generation. Specifically, FIG. 21A is a template intended for user research in a business application; FIG. 21B is a template intended for user research in consumer applicable environment; FIG. 21C is a template intended for user research on brand perception and differentiation. As shown in FIG. 21A, some distinguishing aspect of user research in a business application (for business-to-business "B2B" type interactions) includes information directed to job related information (e.g., job background, job profile, job specific goals, motivations, and frustration), design objectives, associated interaction and tasks, and the ecosystem (i.e., functional, physical, or organizational environment). In contrast, user research on brand perception includes information directed to brand preference such as interests and influence, specific brand perception, lifestyle and life-stage motivation, and relationship to the business. Some templates may have high degree of commonality, for example, user research in a consumer applicable environment (for business-to-consumer "B2C" type interaction) and user research in business application are interested on similar type of information, but are directed to different focus, thus may share similar templates.

Interview Capture Tool

Figure 3:
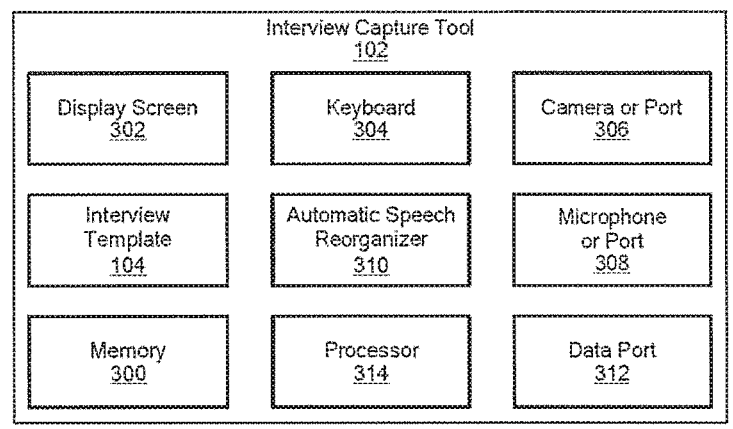
FIG. 3 is a schematic block diagram of an interview capture tool according to an embodiment.

FIG. 3 is a schematic block diagram of an interview capture tool 120 according to an embodiment. The interview capture tool 102 is preferably embodied in a portable computer, such as a tablet computer, thus may be referred to as a portable interview capture tool. A user, as used in the context of the interview capture tool, is an interviewer, who is soliciting a response from the interviewee via the tool, and any persons assisting the interviewer during the interview.

The interview capture tool 102 includes a disk drive or other storage device for storing one or more interview templates 104, as well as memory 300 for storing data collected from interviewees. The memory 300 may also store interview items, where each interview items contains an associated interview question to be potentially asked by the interviewer. A display screen 302 displays prompts to an interviewer, based on the interview template 104. The prompts may be part of a sequence of interview questions in the interview templates 104.

The interview template may store information about the order of sequence in which a subset of the interview items is to be processed during the interview. An interview item generally refers to an indication or type of input control to be displayed by the graphical user interface to receive a response to the interview question. The indication may be derived from a data value or signal applied to a rendering object or synthesized signal, such as text, image, or audio. The indication is preferably a set of displayed text manifesting the interview questions. A graphical user interface is a combination of the interview capture tool hardware and a software module that provides a visual queue of the interview items to the interviewer. In the illustrative embodiment, the graphical user interface is interview capture tool (hardware/software). In alternate embodiments, the graphical user interface may represent a software module that interfaces to the interview capture tool 102.

The interviewer may enter data representing responses from the interviewee via a keyboard 304, which may be a virtual keyboard displayed on the display screen 302 or it may be a real keyboard coupled to the computer via a cable or via a wireless connection. Optionally, the display screen 302 may be configured to be touch sensitive, and hardware or software in the interview capture tool 102 may recognize hand writing or other gestures entered via the display screen 302. In alternative embodiment, the interview items presented to the interviewer may include at least a conditional branch from the set of interview questions. Similarly, the interview capture tool 102 may capture a response corresponding to a conditional branch of a received response to the interview questions.

The interview capture tool 102 includes one or more user-interface subsystems that facilitate an interviewer's entering information about an interviewee or a context in which the interviewee operates. The interview capture tool 102 may include a still or video digital camera and/or a port by which still or video images from a separate camera may be transferred to the interview capture tool 102 (collectively referred to as a "camera or port" 306). Using the camera or port, the interviewer may capture still or video images of the interviewee, the interviewee's work environment or other scenes that the interviewer deems necessary or advisable to preserve. The interview capture tool 102 stores the images in association with responses from the corresponding interviewee. These images may be used later during persona generation.

The interview capture tool 102 facilitates capturing observations and audio during an in-person or remote interview session. The interview capture tool 102 may also include an audio (speech) recording device 308 and an automatic speech recognizer (ASR) 210 to transcribe the recorded audio.

The information entered and any information acquired the interview (such as audio, video, or still images) may be received through the graphical user interface, which may receive the information as data from the keyboard 304, the camera or port 306, the automatic speech reorganizer 310, the microphone or port 308, and the data port 312. Additionally, the graphical user interface may be part of a software application operating in a computer environment having data fields for the interviewer to enter the data. The data fields may includes text or files that are audio or video that can be added.

In the illustrative embodiment, the interview capture tool 102 allows interviewers to link to interview templates 104 created by desktop computing software and to input observations and interview subject responses directly into the device during an interview or thereafter. Interviewers or interviewees can enter responses using an on-screen keyboard, a separate hardware keyboard, via handwriting onto the surface of the device or by allowing the software to translate recorded speech into written responses. The interview capture tool 102 also records, in memory 300, an entire interview session for later analysis.

The interview capture tool 102 (FIG. 1) may include one or more user interface subsystems that facilitate an interviewer's entering or capturing information about an interviewee or a context in which the interviewee operates. The information typically includes ethnographic data, from which data-driven personas may later be generated.

The interview capture tool may also include a stored interview template (perhaps with questions or prompts) and display screen to guide an interviewer while the interviewer interviews a set of people. The interview capture tool may also include a port for uploading collected data to a server having a separate memory or storage device. The server may store audio files or signals captured by the interview capture tool 102. The interview capture tool 102 may upload the responses as they are captured directly to the server. Similarly, the interview capture tool 102 may download interview items from the server during the interview. The download may be the result of a conditional branch enabled due to a response by the interviewee or a prompt by the interviewer. The interview capture tool may be implemented as an application for an iPad or similar portable electronic device, mobile PCs, and a mobile phone.

In the illustrative embodiment, the interview capture tool 120 supports the acquiring of data use to generate personas, market segment information, and/or scenarios. For example, metadata may be stored in association with the stored images. This metadata is referred to herein as a tag. Some tags, such as a timestamp, are automatically applied to responses by the interview capture tool 102. Other tags are selectively applied by interviewers. The tags may include a timestamp and a date of capture, an identity of the interviewee and interviewer, the employer, and a classification of the images. The classification may be in terms of an interview question or a group of questions, such as "current responsibilities" or "work environment." The interview capture tool 102 user interface includes buttons, pull-down lists or other user interface features representing the various tags that may be applied to a response by an interviewer.

In an alternative embodiment, the interview capture tool 102 may tag a response based upon the context of the question being asked (i.e., the interview item being presented). The tagging may also result due to certain pre-specified keywords being recognized as part of the response.

Figure 7:
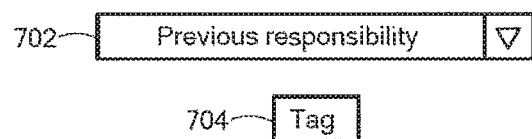
FIG. 7 illustrates a graphical user interface with a tagging interface for an exemplary pull-down list according to an embodiment.

FIG. 7 illustrates a graphical user interface with a tagging interface for an exemplary pull-down list 702 according to an embodiment. The interviewer selects a tag by selecting an appropriate entry in the pull-down list 702 and actuating a "tag" button 704.

Figure 8:
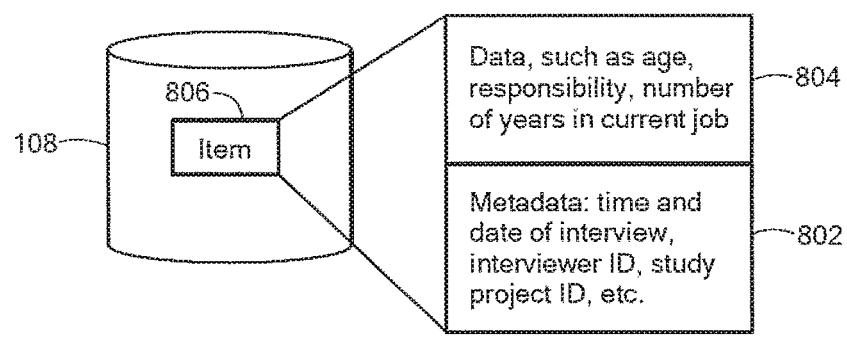
FIG. 8 schematically shows the interview capture tool storing metadata in association with data in a response item according to an embodiment.

In response, the interview capture tool 102 stores metadata 802 in association with data 804 in a response item 806 as shown schematically in FIG. 8. The response item 806 include data 804, such as age, responsibility, number of years in current job, or any of the items in list of items 200. The metadata 802 may include supporting contextual information about the interview, such as time, date of the interview, interviewer ID, study project ID, etc.

Optionally, the metadata is stored in a separate database 132, as shown in FIG. 1, and the metadata and the data are linked, such as via pointers. Metadata in interview capture tools may be used to elicit information other than personas, and scenarios.

Similarly, the interview capture tool 102 may include a microphone or port 308, by which the interviewer may record speech uttered by the interviewer or by the interviewee. The audio may be captured by the microphone 308, which is part of the interview capture tool 102 or by a separate microphone or audio recorder coupled by a cable or wirelessly to the interview capture tool 102 via the port 308. For example, a Bluetooth wireless microphone may be used. The interview capture tool 102 stores the recorded audio in timed association with responses from the corresponding interviewee. Optionally, the interview capture tool 102 includes an automatic speech recognizer (ASR) configured to recognize the recorded speech. Automatic speech recognition may save the interviewer effort in recording responses from the interviewee, in that the responses may be automatically recognized, rather than requiring the interviewer to transcribe to summarize the responses via the keyboard 304. Even absent the automatic speech recognizer 310, an audio recording of an interview may be used by the interviewer or another analyst later, after the interview has been completed, to review the interview and enter, correct, edit, or augment interview data. Recorded audio and recognized speech are also tagged, as discussed above.

The audio signal may be captured in part via the graphical user interface. Preferably, the graphical user interface provides a prompt to the user to allow for segmentation of the audio signal (corresponding to the response of the interviewee) to be separately stored as a file. The files may be comma delimited (CVS file). The file may be indexed or tag to the corresponding question (i.e., interview item). The interview capture tool may employ the speech or signal processing to determine gaps in the speech to determine when the next question is asked.

The interview capture tool may further provide a confidence level via the graphical user interface (or in some instances, an audio queue) of the level of accuracy of the recognized speech being generated by the automatic voice reorganizer 310. In the illustrative embodiment, the voice reorganizer 310 contains a speech recognition module to allow for the received response (i.e., speech) to be converted to text to be displayed to the user via the graphical user display. The interview capture tool 102 may display the text only in instances where the level of confidence of transcription being performed is above a pre-determined level.

A data port 312, such as a USB port or a wired or wireless computer network connection, facilitates copying the collected and entered interview data from the memory 300 to the interview data database 108 (FIG. 1) for further processing. A processor executes instructions stored in the memory 300 or in another memory (not shown) to perform the functions described herein.

Many of the data elements in the persona master data set 100 (FIG. 1) and, therefore, many of the data elements in the interview template 104 (FIG. 3) appear to be open-ended and, therefore, appear to call for free-text responses, rather than multiple-choice responses. Examples of such apparently open-ended questions include "Area of responsibility" 202, "Responsibility 1" 204, "Responsibility 2" 206 and "Responsibility 3" 208. Initially, this may be the case, and the interviewer may enter the interviewee's response verbatim, or the interviewer may summarize the response. However, after interviewing a number of interviewees, the interviewer may notice that responses from the interviewees fall within a relatively small number of categories, groups or types of responses. In other words, the interviewer may be able to abstract the responses and identify a finite and relatively small number of options, from which all or most of the interviewees could have chosen their responses. For example, although each of the interviewees may have reported responsibilities using different words and phrases, after hearing a relatively small number of responses, the interviewer may be able to define a small set of options, such as "Interact with customer to receive loan application," "Access electronic systems and generate customer credit report," "Approve/deny loan application," and "Review denied loan application appeals."

The interview capture tool 102 includes a user interface that facilitates modifying an interview template 104, during or after the interview process, to change a question from calling for an open-ended response to calling for a multiple-choice response. Once the question has been changed, the display screen 302 displays a pull-down (or other appropriate) graphical user interface (GUI) element listing the finite number of choices, rather than a text box (or other appropriate) GUI element more suitable for a free-text response.

Figure 4:
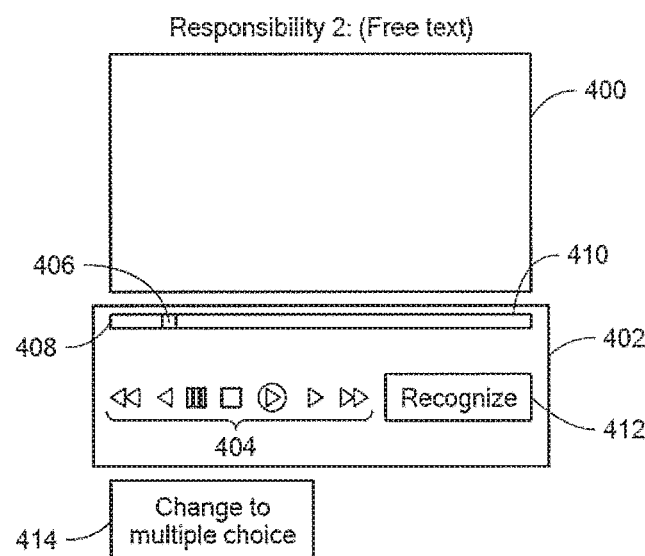
FIG. 4 is a schematic block diagram of a graphical user interface for capturing a free text response or a free text summary of the interviewee's response according to an embodiment
Figure 5:
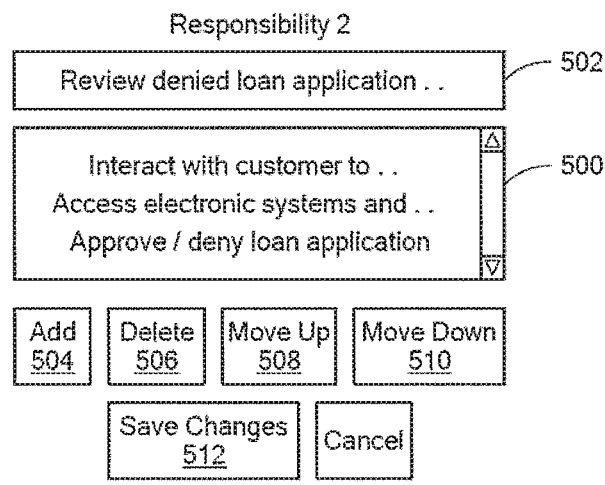
FIG. 5 is a schematic block diagram of a graphical user interface of an aspect of the interview capture tool according to an embodiment.
Figure 6:
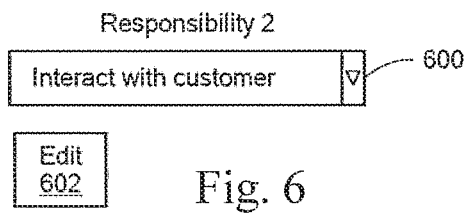
FIG. 6 is a schematic block diagram of a graphical user interface of another aspect of the interview capture tool according to an embodiment.

FIGS. 4-6 are schematic diagrams of aspects of the interview capture tool 102 user interface that facilitates modifying an interview template 104. In this example, "Responsibility 1" is collected; however, the principles illustrated here apply to other interview template data items. FIG. 4 illustrates GUI elements for capturing a free text response or a free text summary (entered by the interviewer) of the interviewee's response. The interviewer may set focus to a text box 400, such as by "clicking" on the box 400, and then the interviewer may use the keyboard 304 (FIG. 3) to enter text in the text box 400, as is well known in the art.

Optionally or alternatively, the interviewer may use recognized real-time or recorded audio to enter or augment text in the text box 400. An audio control panel 402 includes controls 404 to play, fast-forward, rewind, pause, etc. audio that has been previously recorded using the microphone or port 308 (FIG. 3) of the interview capture tool 102. A time indicator 406 displays the relative time of audio being currently played through a speaker or audio output port (not shown) of the interview capture tool 102. The interviewee may advance two sliders 408 and 410 to delimit the beginning and end, respectively, of the audio that is to be recognized. Once the desired audio has been delimited, activating a "Recognize" button 412 causes the automatic speech recognizer 310 to recognize the delimited audio (presumably speech) and insert corresponding recognized text at the current cursor position in the text box 400.

As noted, after interviewing several interviewees, the interviewer may have identified a finite number of choices which the interviewer now wishes to present to subsequent (or past) interviewees, rather than soliciting free text responses to a given question. FIG. 5 illustrates an aspect of a GUI's free-text to multiple-choice operation, according to an embodiment. Activating a "Change to multiple choice" button 414 changes the user interface to the one shown in FIG. 5. A scroll list 500 displays options (possible choices in a multiple-choice question) available for an interviewee to select. Initially, the scroll list 500 is empty. The interviewer may enter text representing a new choice in a text box 502 and then click an "Add" button 504 to add the entered text to the scroll list 500. Similarly, the interviewer may select one of the entries in the scroll list 500, and the GUI displays the entry's text in the text box 502, and the interviewer may edit the text. Selected entries in the scroll list 500 may be deleted with the "Delete" button 506, and their orders in the scroll list 500 may be changed with the "Move up" and "Move down" buttons 508 and 510.

Once the interviewer has made all necessary changes, the "Save changes" button 512 commits the changes to the interview template 104, and the GUI shown in FIG. 4 changes to one shown in FIG. 6. In FIG. 6, instead of a text box 400 (as in FIG. 4), the GUI includes a pull-down list 600 populated with the choices in the scroll list 500 (FIG. 5). The interviewer can return to the GUI shown in FIG. 5 by activating an "Edit" button 602 (FIG. 6). Thus, the interviewer may refine the choices in the scroll list 500, such as by editing the text of any choice, adding additional choices to the scroll list 500 or deleting choices from the scroll list 500.

Once the interview capture tool 102 has completed collecting data from one or more interviewees, the corresponding interview data 108 may be copied from the interview capture tool 102 to a central repository, such as a network-based server (not shown). As noted, the data port 312 (FIG. 3) may be used to upload the interview data 108 to the server.

Persona Modeler

The persona modeler 110 (FIG. 1) reads the interview data 108 and facilitates developing one or more personas using the interview data 108. For example, the persona modeler 110 facilitates identifying groups of interviewees who have common or similar characteristics, i.e., clusters of interviewees. FIGS. 9A-J illustrate exemplary user interfaces of the persona modeler 110. Although persona generation from interview data is described, personas can also be generated from fabricated data, i.e., data that is entered by the user and not necessarily collected from interviewees or a combination of collected and fabricated data. A user, in the context of the persona modeler, is generally a person using the persona modeler to generate a persona.

Figure 9A:
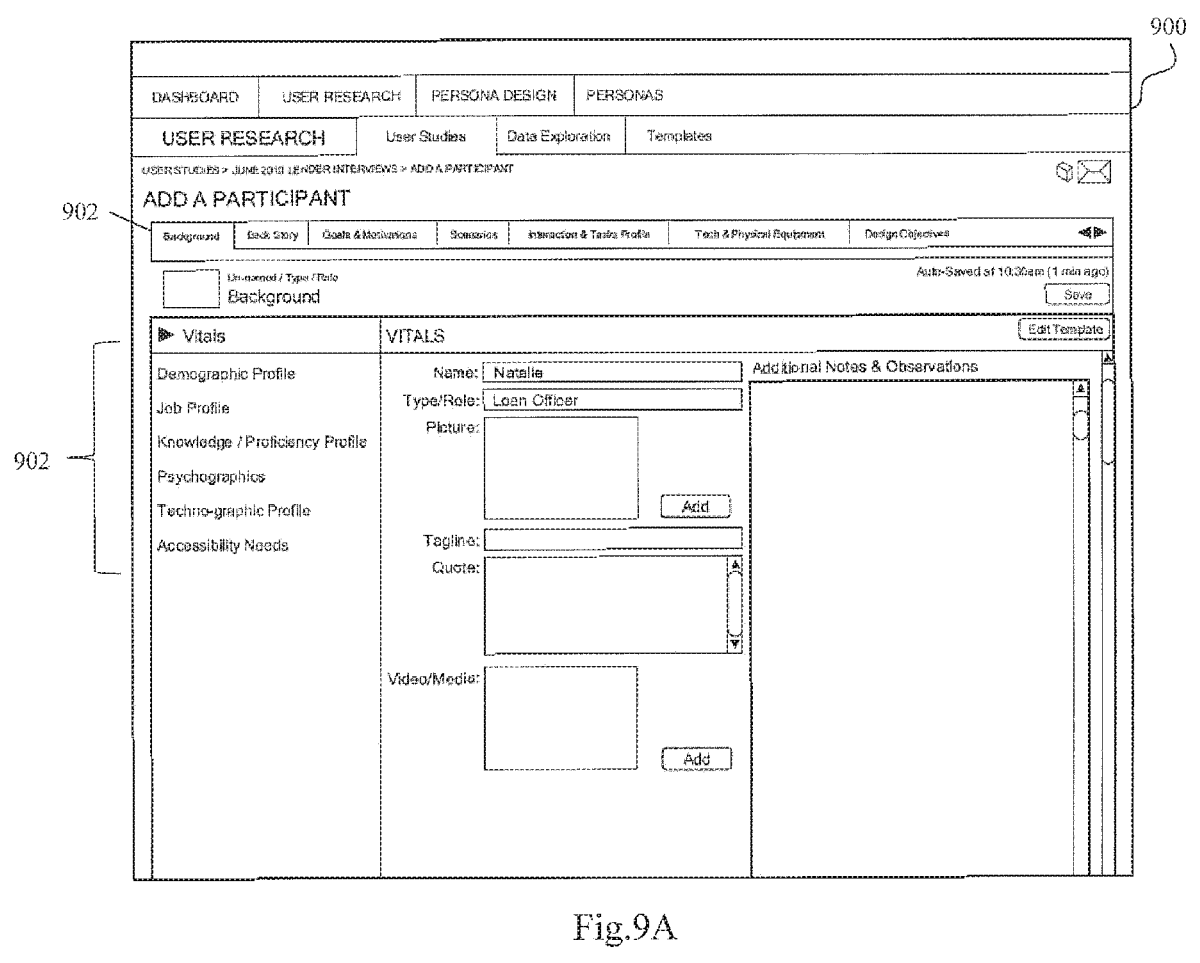
Figure 9B:
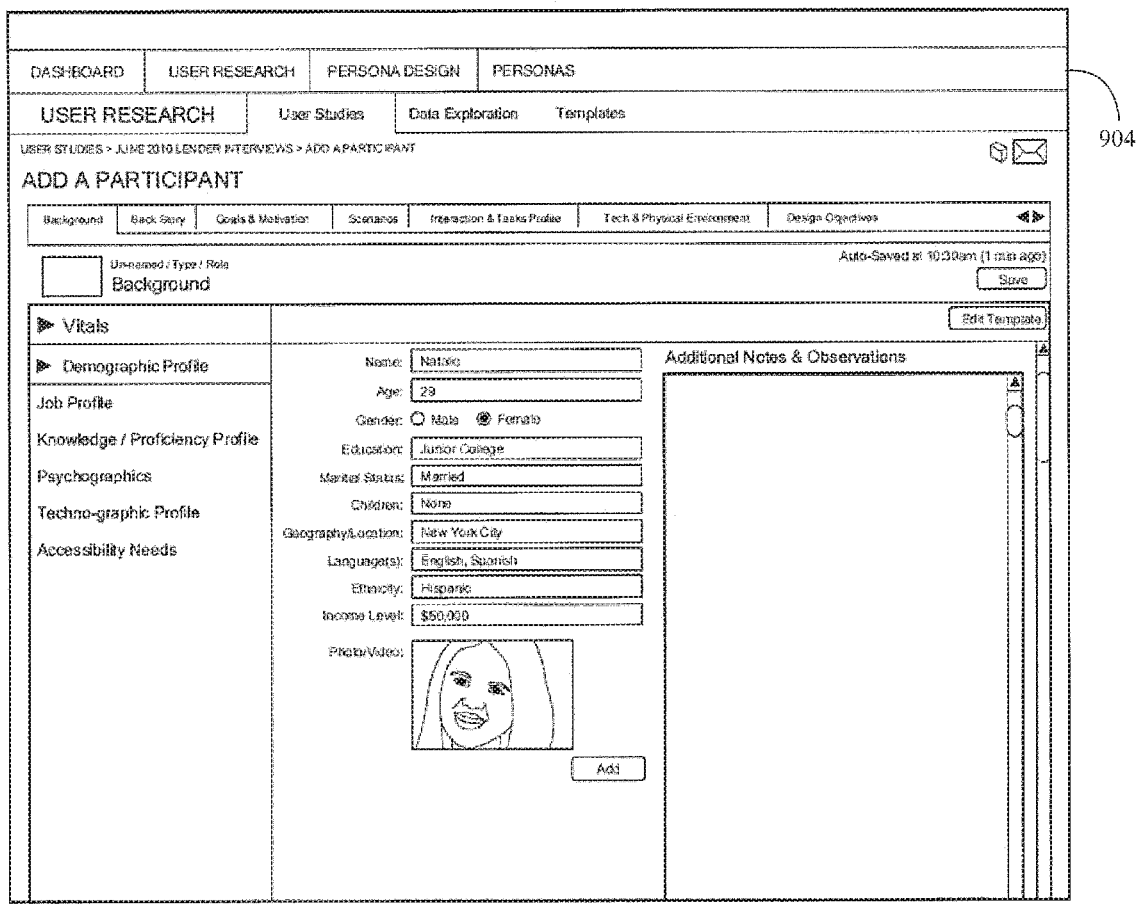

FIGS. 9A and 9B schematically show graphical user interfaces 900, 904 of the personal modeler according to an aspect of the embodiment. The interfaces 900, 904 allows for user manual inputting of data to the personal modelers. The interfaces 900, 904 include tabs 902 to navigate to the various data categories 201 and sub-categories 203 corresponding to the data items 200. Here, the data items are being inputted for the background related information 202 (FIG. 9A) and demographic related information 204 (FIG. 9B).

Figure 9C:
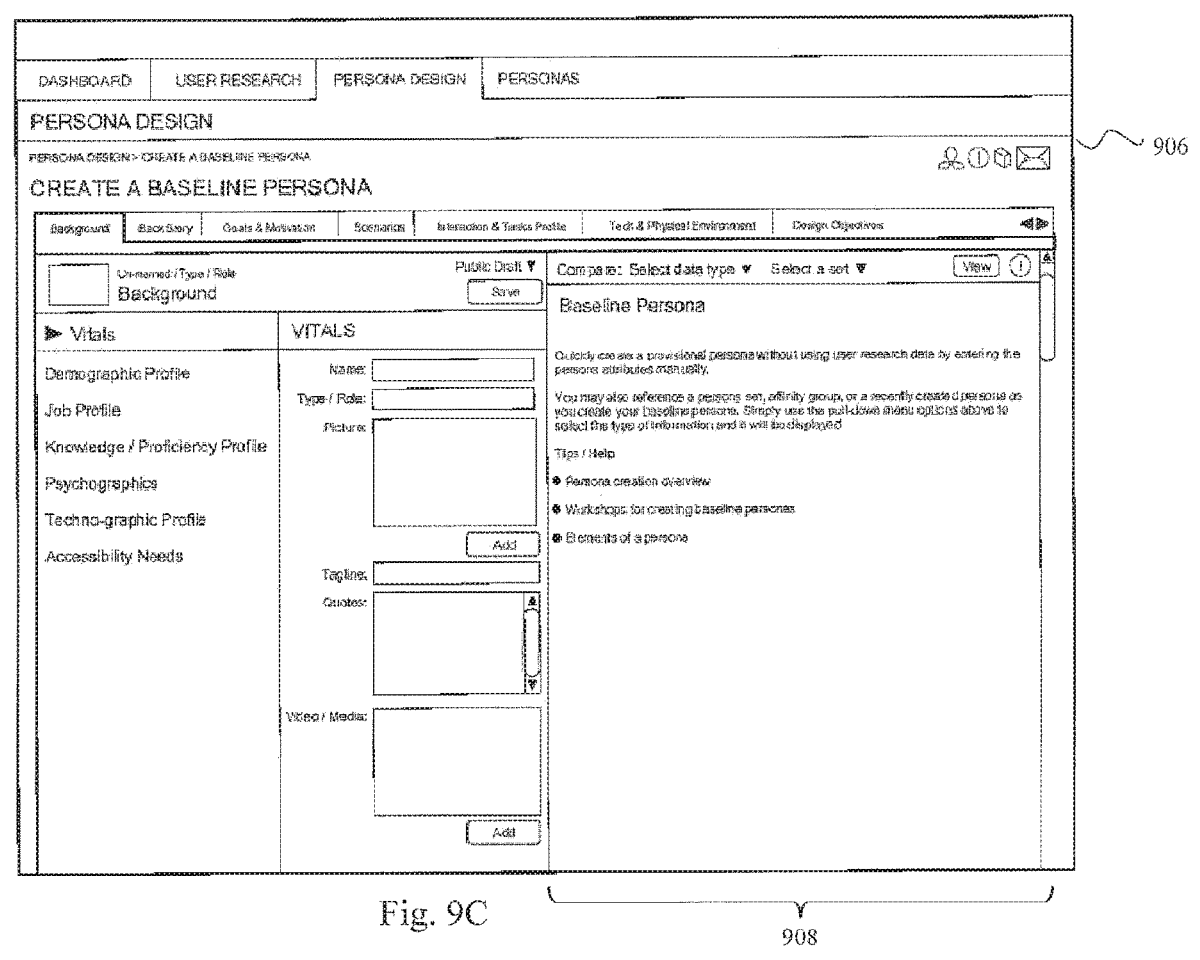

FIG. 9C schematically shows another aspect of the graphical user interface 906 to generate a baseline persona. As indicated, baseline personas are based purely on a creator's and/or other stakeholders' assumptions about people in a targeted audience. The interface allows for quick entry of personas. In addition, the interface 906 provides a user assist section 908 that may include help-guides, explanatory information, and tips to assist the user in navigating through the tools and to generate the baseline persona. The user would input only the applicable information for the baseline persona and the system would generate an output report showing only the fields containing a data value.

Figure 9D:
FIG. 9D schematically shows yet another aspect of the graphical user interface to generate a baseline persona according to an aspect of an embodiment.

FIG. 9D schematically shows yet another aspect of the graphical user interface 910 to generate a baseline persona. The interface 910 provides a persona guide section 912. The persona guide section 912 may display recently-generated baseline personas as well as stored personas (including personas for other projects, or personas generated through interview or research) to provide guidance to the user. The persona guide section 912 may include productivity functions, such as duplicate function 914 that may duplicate the data fields of a viewed data sub-category in to the currently editing persona.

Figure 9E:
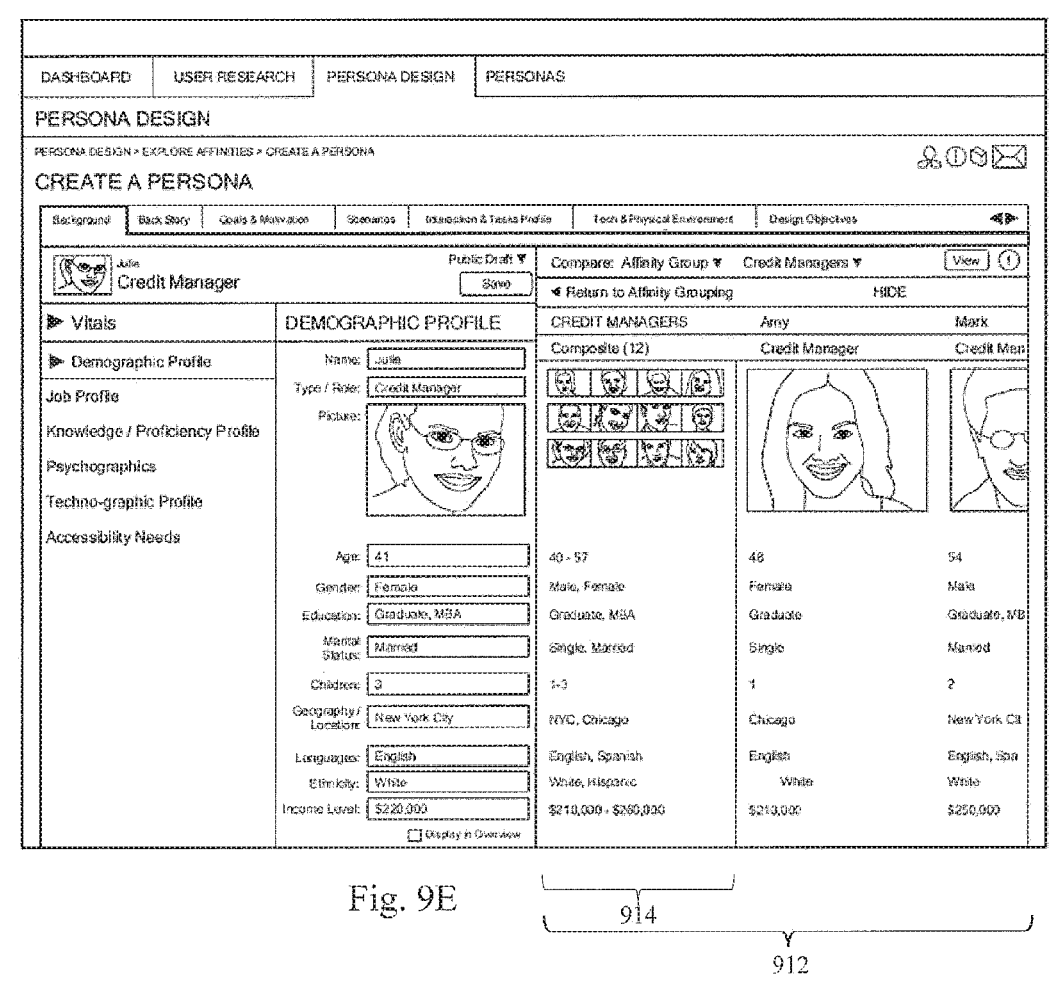

In the illustrative embodiment, the system provides a persona information section 914 to provide the user with information available in the persona guide section 912 or a database accessible by the interface. The system allows the user to browse and display previously stored classes of personas or groups of interviewees in the persona information section 914. A class of interviewee having similar characteristic attributes is referred to as an affinity groups (as shown in FIG. 9E).

In alternative embodiments, the system may employ search functions integrated into the data field to assist the user in navigating information available in the database and displaying search information in the persona information section 914. For example, the system may monitor the most current field being edited by the user on interface 910 and use the input by the user as a keyword search to display previously or stored personas meeting the search criteria.

Alternatively, the system may monitor the most current field being edited by the user and use the inputs as a keyword search against a pre-defined list. The search would result in items in the pre-defined list not present in persona guide section 912 to be displayed as a dialog box in proximity to the current field being edited by the user. In another embodiment, the system may merge (e.g., via concatenation) the data fields in the persona guide section 912 and display the merged data field.

Figure 9F:
FIG. 9F schematically shows an aspect of the graphical user interface to generate affinity groups according to an aspect of an embodiment.

FIG. 9F schematically shows an aspect of the graphical user interface 916 to generate affinity groups. Some operations of the persona modeler 110 (such as affinity group generation through faceted search) are illustrated by way of a flowchart in FIG. 18 to be described in conjunction with FIG. 9F. At 1800, the interview data 108 is input into the persona modeler 110. Some of the interview data items are numerical, such as age, highest school grade attended and number of children. Other of the interview data items are choices from multiple-choice lists. Yet others of the interview data items contain free text.

At 1802, groups of interviewees are automatically identified, based on the values of the interview data items. Often, the values of interview data items cluster around landmark values that represent groups of interviewees. For example, each group of interviewees may have a similar number of years of work experience. That is, one group of interviewees may have work experiences that cluster around 3 years, whereas a different group of interviewees may have work experiences that cluster around 20 years. Known knowledge discovery, data mining or information extraction techniques, such as fuzzy logic, genetic algorithms, group detection algorithms (GDA), k-groups (Kubica, et al., 2003) or algorithms for group discovery on large transactional data (such as XGDA), may be used to discover underlying groups or clusters in the interview data. The interview data items that yield these groups are considered for use as filter criteria in subsequent stages.

At 1804, the minimum and maximum values for each numerical data item are identified. For example, the minimum and maximum ages of the interviewees are determined.

At 1808, one or more statistical values are calculated for each interview data item susceptible to such calculations. For example, the mean age may be calculated. Statistical values for non-numeric interview data may also be calculated. For example, for a multiple-choice data item, the most frequently given response may be treated as the mode for the data item. Similarly, if a set of multiple-choice data items represents points along a continuum, the most frequently given response may be treated as the mode for the data item. Other statistical calculations are possible.

Once these statistical values are calculated, at 1812, ranges are determined for the previously-determined filter criteria. That is, interview items that yield groups are displayed as filters, and ranges of actual values of these interview items are displayed as minima and maxima. FIG. 9E shows a hypothetical display generated from interview data. On the left side of the display, filters 918 are displayed. For example, within the collected interview data, groups were automatically discovered for experience 920, years at company 922, income 924, age 926, etc., and corresponding filters, in the form of range sliders 928, are displayed.

Figure 12:
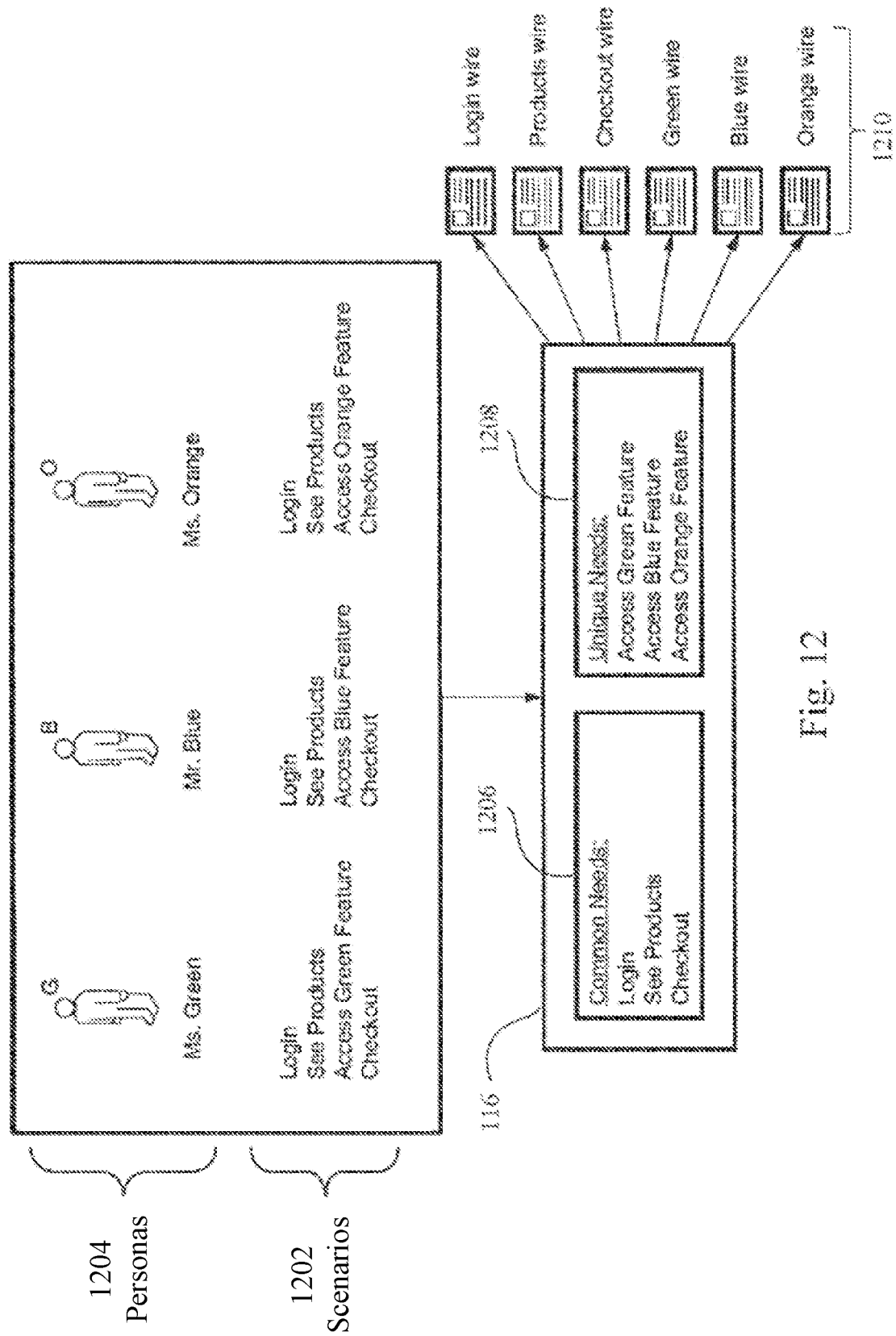
FIG. 12 schematically shows an aspect of the operation of the scenario modeler according to an embodiment.
Figure 18:
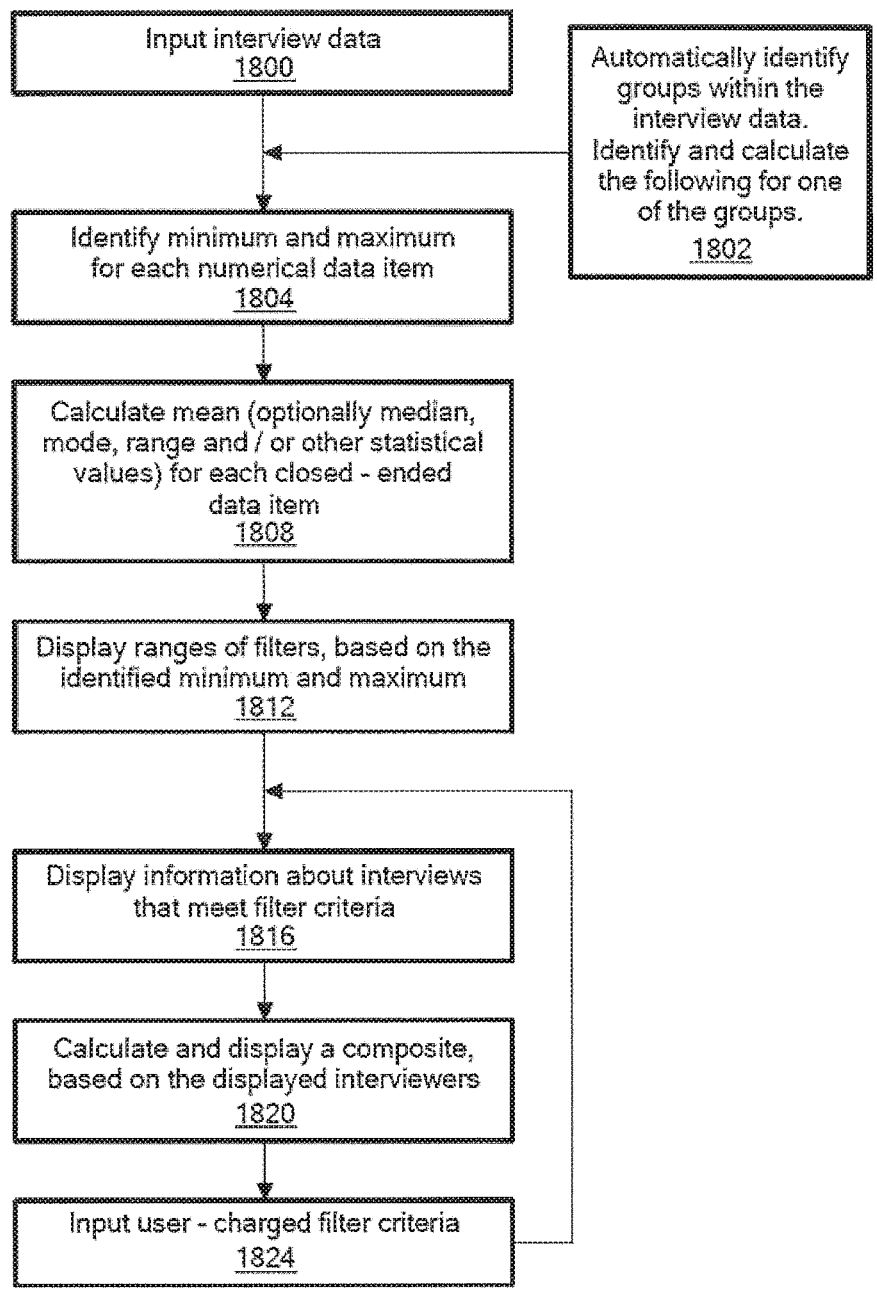
FIG. 18 is a flowchart illustrating some operations of the persona modeler of FIG. 1.

In the center portion 930 of the user interface 916, information about each of the interviewees who matches the filter criteria is displayed. This operation is represented at 1816 in the flowchart (FIG. 18). At 1820, the persona modeler 110 calculates a composite, based on the displayed interviewees 930. The composite may include mean, median, mode, range and other statistical values calculated from the interview information of the displayed interviewees in section 930. The composite 932 is displayed in the right portion 1214 (FIG. 12) of the user interface.

At 1824, the user may adjust the sliders in the filters 1200. In response, control returns to 1816, and the persona modeler 110 adjusts the set of interviewees to include those whose interview data meet the new criteria. The persona modeler 110 updates the displays 916, accordingly. Identifying members of a group of interviewees by specifying values or ranges of values for a plurality of criteria is referred to as faceted search.

The user may also add or remove filter variables in a concatenated manner to further refine the faceted search. In response, the persona modeler 110 recalculates the set of interviewees who meet the (now revised set of) criteria, and the persona modeler 110 repeats the calculations and identifications described above, with respect to operations 1804-1820. Thus, with assistance from the persona modeler 110, the user may experiment with various definitions of a persona and affinity group and may iteratively refine the definition of a persona.

The set of interviewees selected by the filter criteria may be used as an affinity group or as a persona. Once the user is satisfied that the (possibly adjusted) selection criteria are correct or at least useful, that is, once the group represents a group of personas having types of user, shoppers, managers, etc. that is the target of the persona generation project or the group have attributes of interest, the user may invoke the "Save as User Profile", "Create an Affinity Group", or "Create a Persona" button. In response, the persona modeler 110 may generate either a new persona based on the group or new affinity group and stores the composite data. The composite data includes the values displayed in the center portion 930 of the user interface.

Figure 9G:
FIG. 9G schematically shows a graphical user interface 936 providing a persona browser according to an aspect of an embodiment.
Figure 9H:
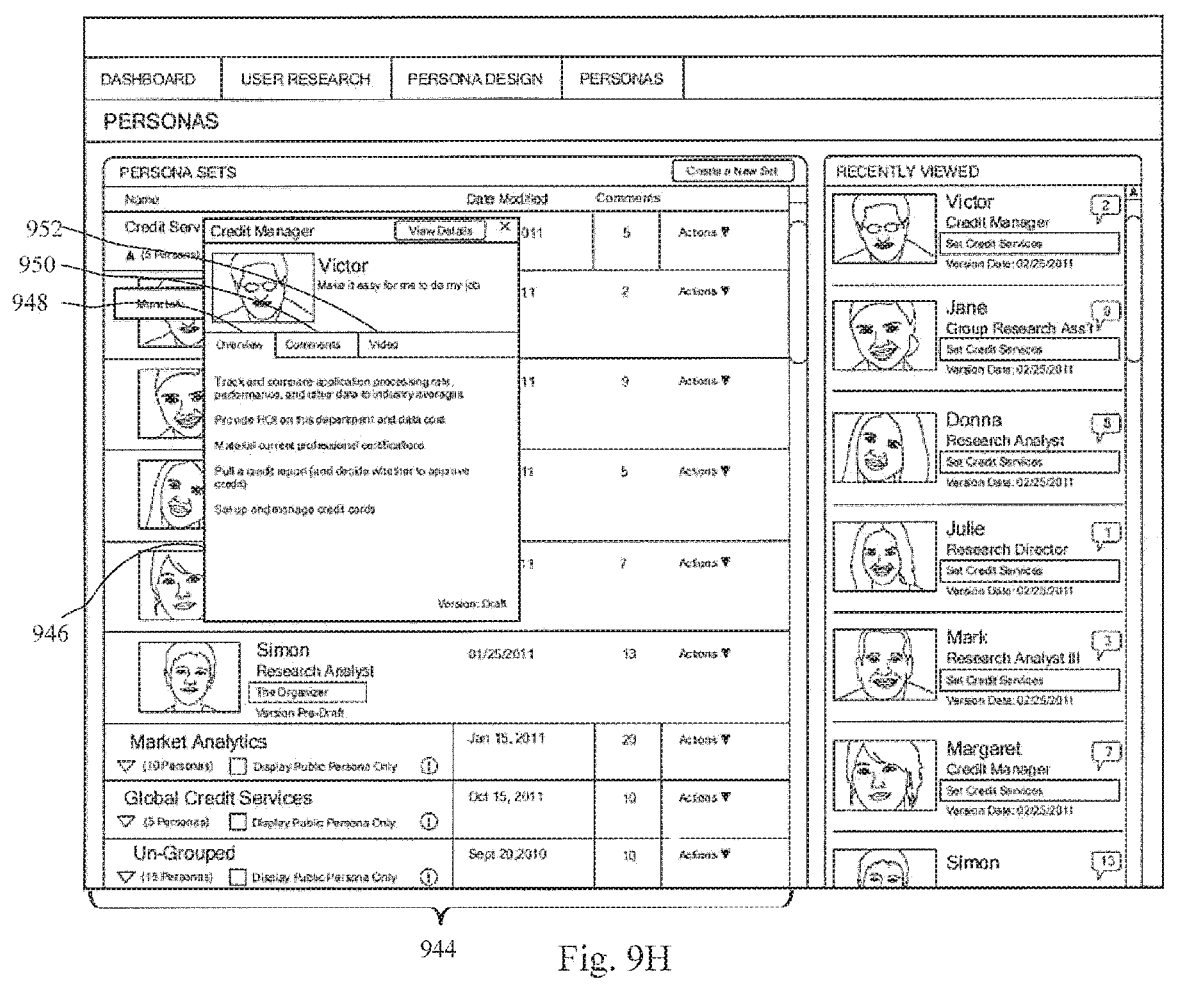

The persona modeler 110 may allow the user to amend and/or add values, text, images, etc. to the newly created user profile, persona, or affinity group. Exemplary user interfaces for such activities are shown in FIGS. 9E and 9F. The user may browse the set of user profiles and/or personas, as shown in FIG. 9G. FIGS. 9H and 9J illustrate exemplary trading card and one-sheet views, respectively, of a user profile or a persona.

The persona modeler 110 is a computer-implemented modeling tool that includes a faceted search capability. A faceted classification system allows assignment of multiple classifications to an object, enabling the classifications to be ordered in multiple ways, rather than in a single, predetermined, taxonomic order. A facet includes clearly defined, mutually exclusive, and collectively exhaustive aspects, properties or characteristics of a class or specific subject. For example, a collection of books might be classified using an author facet, a subject facet, a date facet, etc. Faceted classification is used in faceted search systems that enable a user to navigate information along multiple paths corresponding to different orderings of the facets. This contrasts with traditional taxonomies, in which the hierarchy of categories is fixed and unchanging.

Referring back to FIG. 9E, the system displays an affinity group generated by the various methods described above in persona information section 914.

FIG. 9G schematically shows a graphical user interface 936 providing a persona browser. The persona browser may display the recently generated personas and previously stored personas. The personas may be grouped and displayed in the respective persona sets 940. The browser may further provide a recently viewed persona window 942. A selection of the persona in the window 942 would select and display the persona and the corresponding persona set 940 in the navigation window 944. In the illustrative embodiment, for easy navigation, upon the selection of the mouse being directed over a persona in the navigation window 944, the detail of the persona is shown as a dialog box 946 (as shown in FIG. 9H). The dialog box may display the overview information for the persona 948, display or add comments 950, as well as display video associated with the persona 952.

Figure 9I:
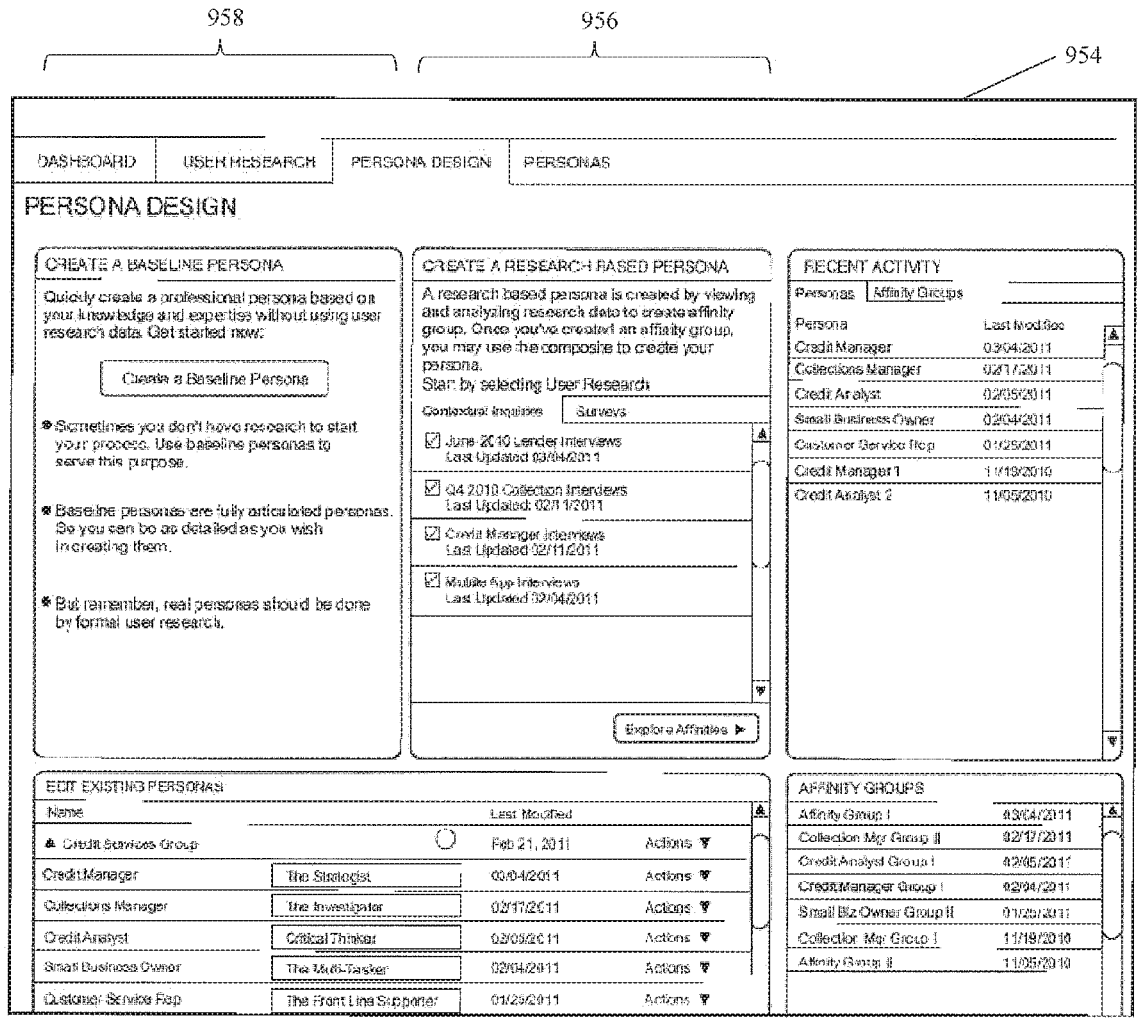
FIG. 9I schematically shows a graphical user interface for managing and importing persona data according to an aspect of an embodiment.
Figure 9J:
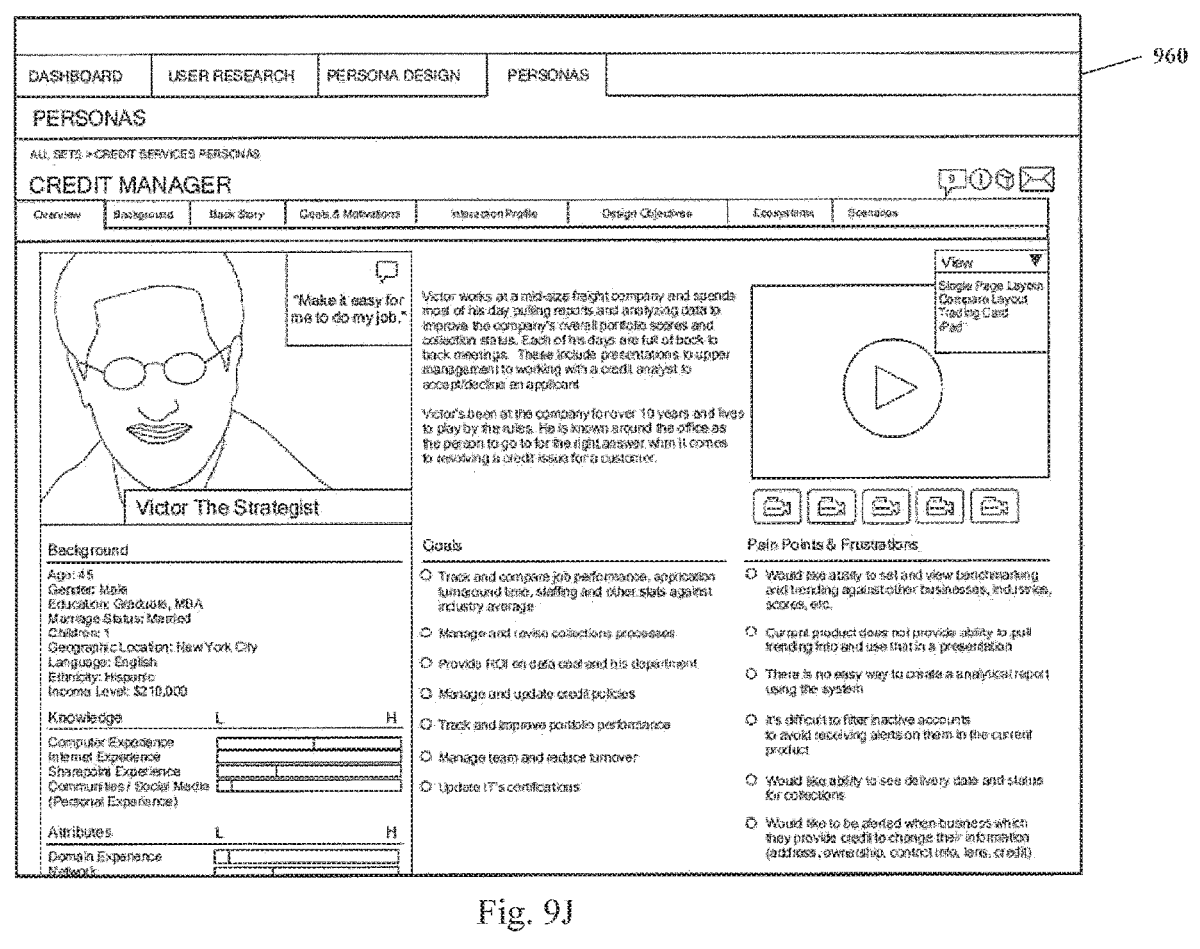

The persona modeler 110 includes a means for importing data from an interview capture tool, other research methods and tools, and/or user-entered (research-based or fabricated) data. FIG. 9I schematically shows a graphical user interface 954 for managing and importing persona data. The interface 954 may include a database manager 956, or an interface to a database manager, configured to read the interview data 108 and/or the bulk data 109. In the illustrative embodiment, the interview data 108 and bulk data 109 are imported from research conducted. The persona modeler 110 may also include a user interface 958 by which a user can enter fabricated data, such as the baseline persona generator.

The persona modeler 110 may receive interview data from more than one study. The persona modeler 110 may further merge the multiple studies as part of the same interview data. For example, the persona data set may include provenance information about each study that contributed to the person (i.e., each study that contributed at least one interviewee who was selected to be in the set of interviewees from which the persona was abstracted).

The persona modeler may include means for importing interview data and an automatic cluster analyzer. The analyzer is configured to automatically identify data representing at least one group of interviewees, from whom the interview data was elicited, within the imported interview data. The persona modeler also includes a faceted search user interface. The user interface is configured to allow a user to filter the data representing at least one group of interviewees, based on characteristics of interviewees. An output module is configured to store information abstracted from the selected interviewee data in GUI and printable formats. An edit module is configured to allow the user to revise the stored abstracted information.

A persona modeler 110 is an interactive software tool that reads interview data 108 and facilitates generation of personas 112. The persona modeler 110 automates some aspects of the persona generation process, and the persona modeler 110 provides data analysis and decision support features that may be used a human user to analyze the interview data 108 and, as a result, partition the interviewees into groups of people having similar characteristics ("clusters"). In addition, the persona modeler 110 accepts user inputs, such as age, gender, etc., or allows the user to accept values associated with a cluster, to define a persona 112.

As indicated, the personal modeler 110 may include a faceted search type user interface (UI) that allows a user to select/filter the imported or entered data based on characteristics of the real or fabricated interviewees. The UI displays correlations among data for the selected interviewees. A cluster analyzer automatically identifies groups within the interview data. An output module stores information abstracted from the selected interviewee data, optionally including an image of one or a representative number of the interviewees or an arbitrary image. The faceted search UI allows a user to experiment with various pre-selection filters based on interviewee attributes ("hypothesis testing"), while the tool displays metrics for the group of selected interviewees. In other words, the user can manually look for correlations. The cluster analyzer uses known techniques to identify groups of resulting interviewees, where members of a given group have similar characteristics, i.e., to identify correlations.

These automatically-identified groups may be used to pre-fill the filters that the user can then accept, reject or modify to select which interviewees are used to form the groups. The persona generator generates an abstracted "view" of the raw data from members of each identified group. The Persona modeler provides two types of aggregate values for each group of interviewees: (1) a profile, with range values for numerical fields, e.g. age: 26-54, and (2) an "Initial Persona" with a single value for each numerical field, e.g. Age: 32. If the responses are "ordinal" or "enumerative," such as grades that a teacher might teach, the profile value will still attempt to display a range, such as Grades Taught: $1^{st}$ through $5^{th}$, even if there were no subjects who taught $2^{nd}$ grade. The Initial Persona value for this attribute will again attempt to identify the most plentiful single value for this field. For example, Grade Taught: $3^{rd}$ grade' would result if $3^{rd}$ Grade had the highest tally for grades taught by the interview subjects. After these values are automatically calculated by the software, the user has the ability to override any of the derived fields in order to customize their Persona or Profile as desired. Many of the important Persona fields are more text based and require users to create plausible but fictitious accounts, such as a "back story" for their persona. Interview responses to personal history responses from the actual interviewees in the group are ready at hand to make this story creation task easier for the user.

Upon a persona being generated, the persona may display a one-sheet summary 960 (as shown in FIG. 9J).

Optionally or alternatively, some or all the data imported by the persona modeler 110 (FIG. 1) originate from bulk or abstracted bulk data (collectively referred to herein as bulk data 109). The bulk data may result from one or more previous studies and/or it may be purchased from another source.

Scenario Modeler

The scenario modeler 116 (FIG. 1) operates in a manner similar to the persona modeler described herein, except the scenario modeler 116 defines scenarios, i.e., activities performed by personas and requirements of the personas, relative to the activities. The interview capture tool 102 captures information about activities and requirements, as part of the interview process described herein.

Optionally, the persona modeler 110 may include a scenario modeler. While a user is reviewing and analyzing interview data for the purpose of generating one or more personas, the user may see information that may suggest or inform a decision about one or more scenarios. Thus, while the information is fresh in the user's mind, the user may enter notes about one or more potential scenarios or define one or more scenarios.

Later, a scenario or notes about a potential scenario may be obtained, as indicated by dashed arrow 127 (FIG. 1), by the scenario modeler 116 from the persona modeler 110, and this information may be used as a basis to define a scenario.

Figure 10:
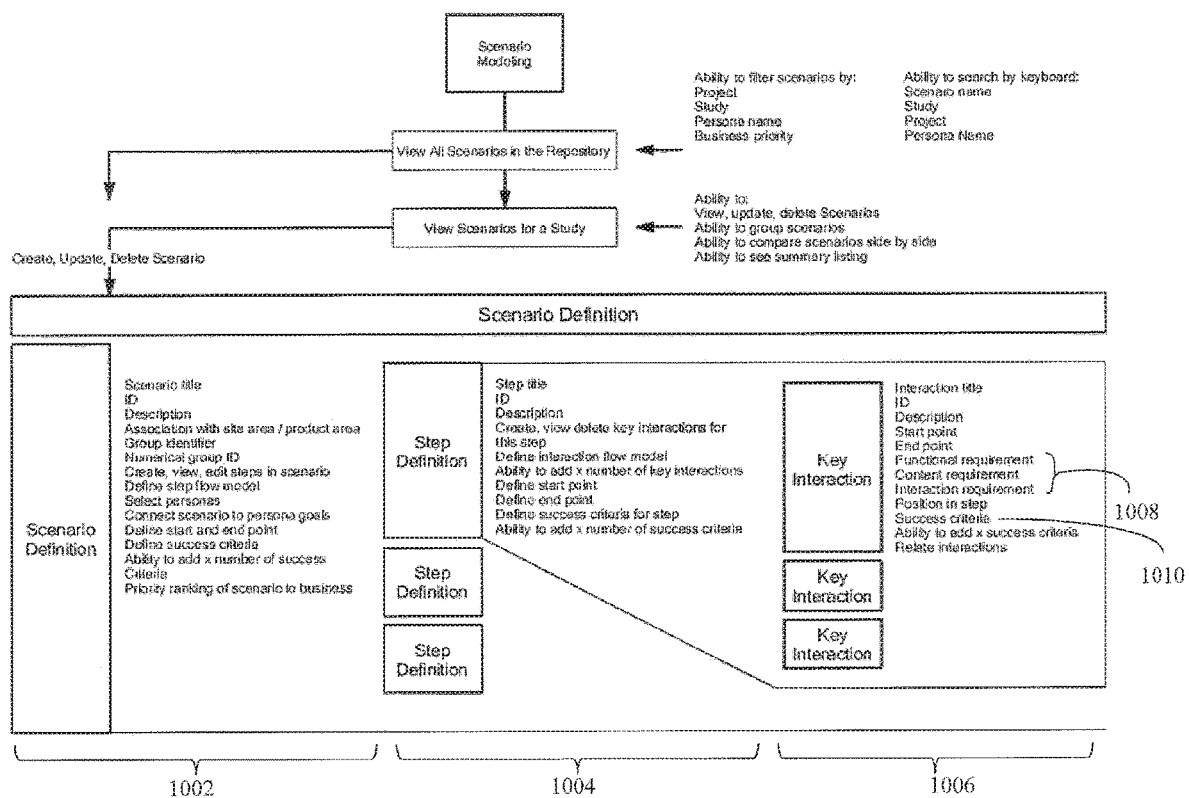
FIG. 10 schematically shows a scenario modeler 116 according to an aspect of the embodiment.

FIG. 10 schematically shows a scenario modeler 116 according to an aspect of the embodiment. As indicated, a scenario 118 is a description of an activity in which a persona may engage, and the scenario generator 116 is an interactive software tool that facilitates generation of scenarios 118. The scenario modeler 116 defines scenarios as parameters 1002 definable, in part, as a series of steps 1004. The scenario modeler 116 subsequently evaluates the series of steps to determine the various key interactions 1006 for each of the steps 1004. The key interactions 1006 may be defined, in part, based upon requirements information 1008 and criteria for success information 1010. The requirements information 1008 may include function requirements, content requirements, and interaction requirements. The scenario modeler 116 outputs a scenario data set, which may include the key interactions 1006, the steps 1004, and the requirement information 1008. The scenario modeler 116 provides a framework to the user to define the key interaction for each step 1004 in the scenario 1002. The steps are combined as a high level descriptive summary.

Figure 11:
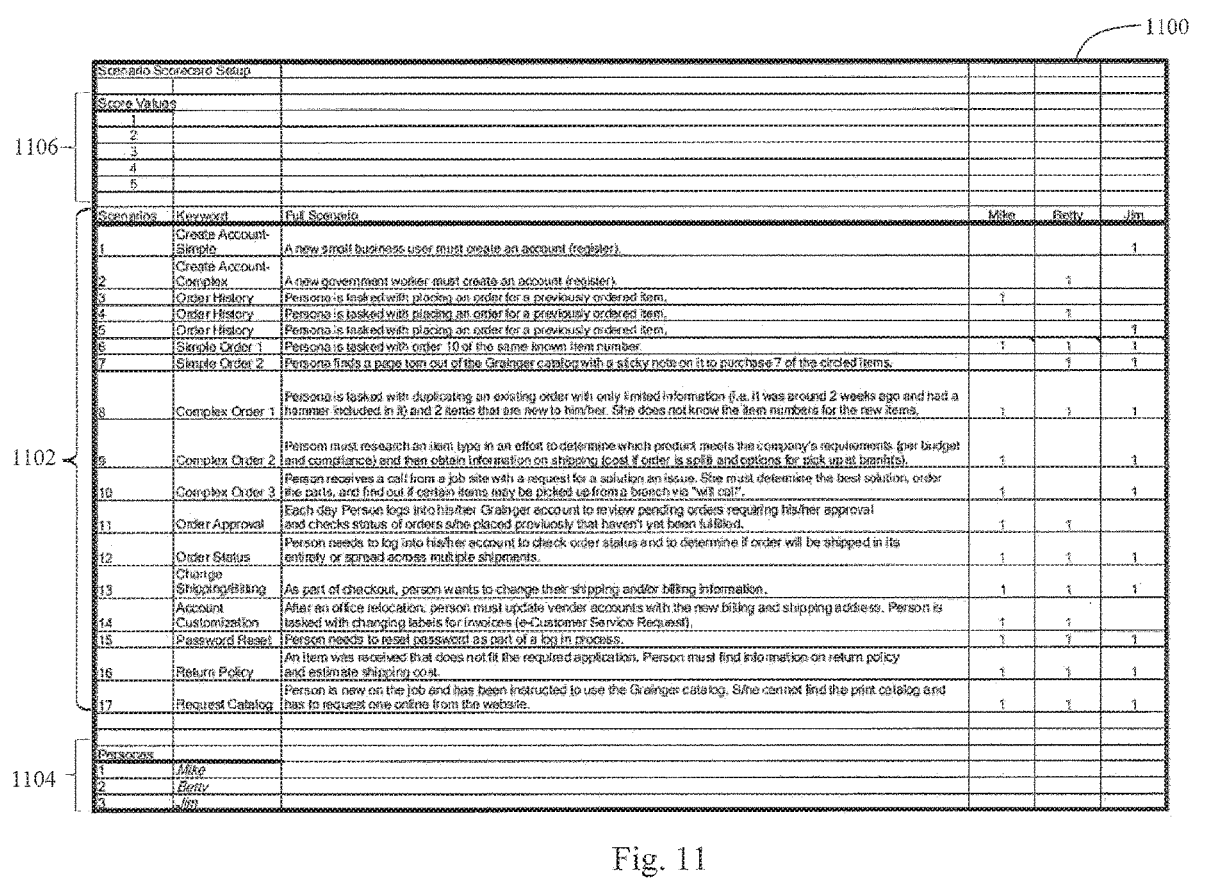

The scenario modeler may prioritize the generated scenario by a priority score determined based upon the number of applicable personas and the level of importance of the scenario. The priority score and the underlying requirements to implement the scenario allow a user or designer to accurately prioritize the critical tasks as well as to properly allocate and/or budget resources. In the illustrative embodiment, a scenario scorecard worksheet 1100 (see FIG. 11) in the scenario modeler 116 generates the priority score. The scenario scorecard worksheet provides a framework to correlate the generated scenario 1102 with the personas 1104 used to generate the scenario and to assign a pre-defined score value 1106 to each scenario. As a result, a scenario may be quantitatively assessed against other scenarios. The list of prioritized scenarios is stored and may be used as a list of prioritized requirements for a designer of a computer software interface to assess their progress and success.

In an alternate embodiment, the scenario modeler 116 aggregates (e.g., tallies) the number of personas having goals correlated to the scenario and produces a priority score by scaling the number of aggregated personas by a weighing factor correlated to the importance of the success to the personas. In another embodiment, the scenario modeler 116 may simultaneously provide the scaled and non-scaled priority score to the user.

In addition, the scenario modeler 116 documents the scenarios 118 showing the overlap and unique need. An example is illustratively provided with FIG. 12. A project is defined to create e-commerce website. The designer and stakeholders of the website have identified three personas as their primary market and customers (e.g., Ms. Green, Mrs. Blue, and Ms. Orange). The list of scenarios 1202 is determined for each of the personas 1204. The scenario modeler 116 evaluates the list of scenarios 1202 to determine common needs 1206 and unique needs 1208. The scenario modeler aggregates the information 1004, 1006 for each scenario to generate a wireframe 1210 for each scenario. As a result, the scenario modeler 116 summarizes specific features for a given personas in a single common specification.

Market Segment Modeler

Figure 13:
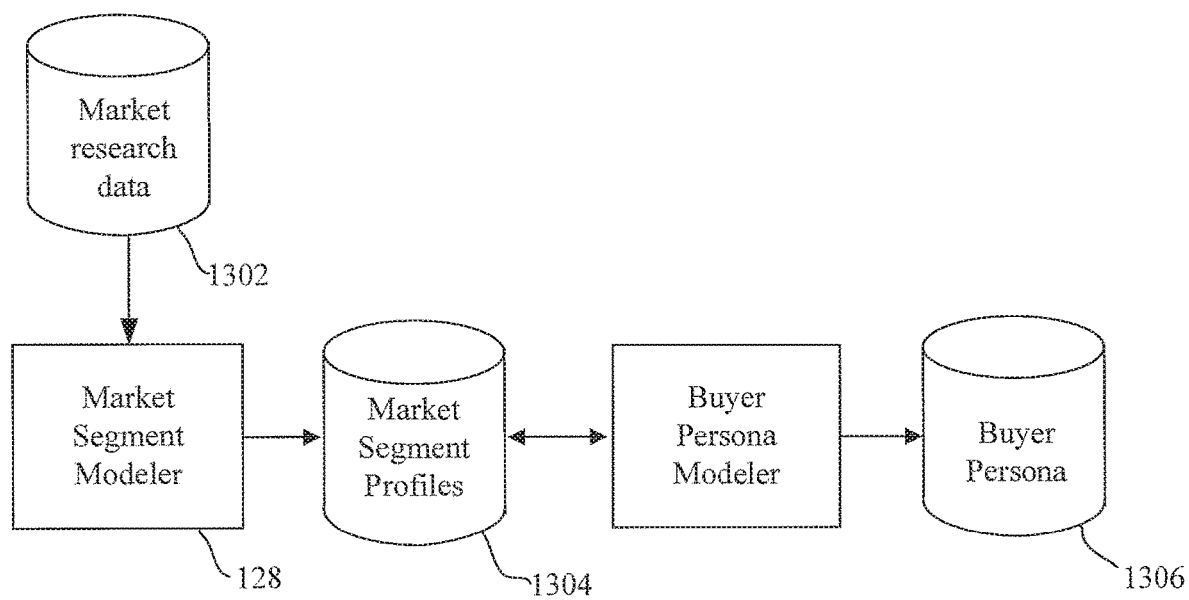
FIG. 13 schematically shows a detail operation of the market segment modeler 128 according to the illustrative embodiment.

Referring back to FIG. 1, a market segment modeler 128 may provide market information to the persona modeler 110 to derive market specific personas, referred to as a "buyer persona." FIG. 13 schematically shows detailed operation of the market segment modeler 128, according to the illustrative embodiment. The market segment modeler 128 imports quantitative market segment statistical data, to organize and present the data in market segment profiles 1302. The market segment modeler 128 may also refine the market segment profiles 1302 via qualitative research and analysis to create actionable buyer profiles, personas, and persona-product connections. An output module is configured to store information abstracted from the market segment data and related qualitative data in GUI and printable formats. An edit module is configured to allow the user to revise the stored abstracted information.

A market segment modeler 128 is an interactive software tool that reads quantitative market research data 1302 and facilitates generation of market segment profiles 1304 and buyer personas 1306. The market segment modeler 128 automates some aspects of the market segment profile 1304 and buyer persona 1306 generation processes, and the market segment modeler 128 provides data analysis and decision support features that may be used a human user to analyze the market segment data 1302 and, as a result, create easy to understand descriptions of people having similar buying characteristics ("market segment profiles"). In addition, the market segment modeler 128 accepts user inputs, such as age, gender, etc., or allows the user to accept values associated with a market segment profile 1304, to define a buyer persona 1306.

Figure 14:
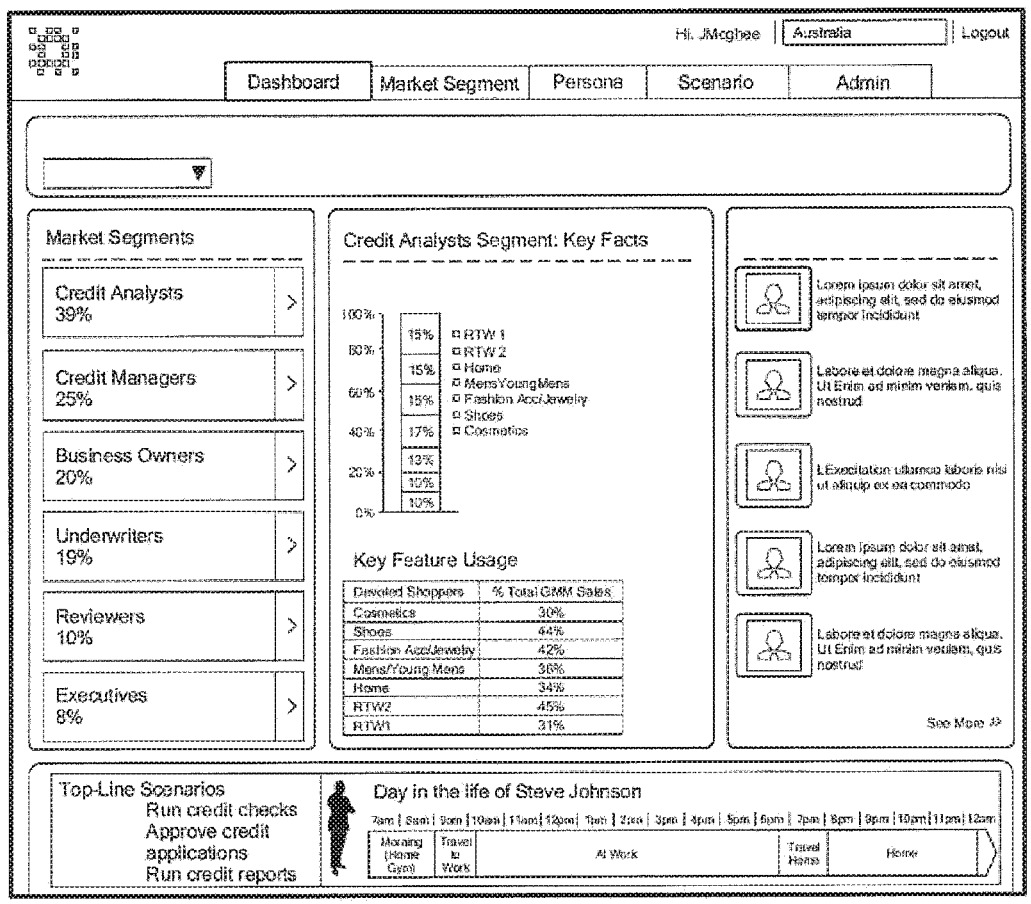
FIG. 14 schematically shows a graphical user interface for the market segment modeler according to the illustrative embodiment.

FIG. 14 schematically shows a graphical user interface for the market segment modeler. The market segment modeler generates market segment profile 1304 and buyer persona templates 1306.

A market segment profile 1304 and buyer persona master data set includes definition of hierarchically organized data items that may be used in market segment profiles or buyer personas. A buyer persona is a data model that represents a fictitious person who is a target buyer of a product or service, such as an end-user of an e-commerce web site.

Figure 15:
FIG. 15 shows a one-sheet summary output of the output generator.

FIG. 15 shows a one-sheet summary output of the output generator. The one-sheet summary provides a consolidated one-sheet report to communicate with designers and stakeholders 119. The one-sheet report may include usability information, a persona profile, key motivations and influencers (e.g., key drivers and pain points), engagement, as well as relationships. In the illustrative embodiment, the profile, responsibilities and relationship information are fabricated based upon a contextual story around the persona and scenario.

Figure 16A:
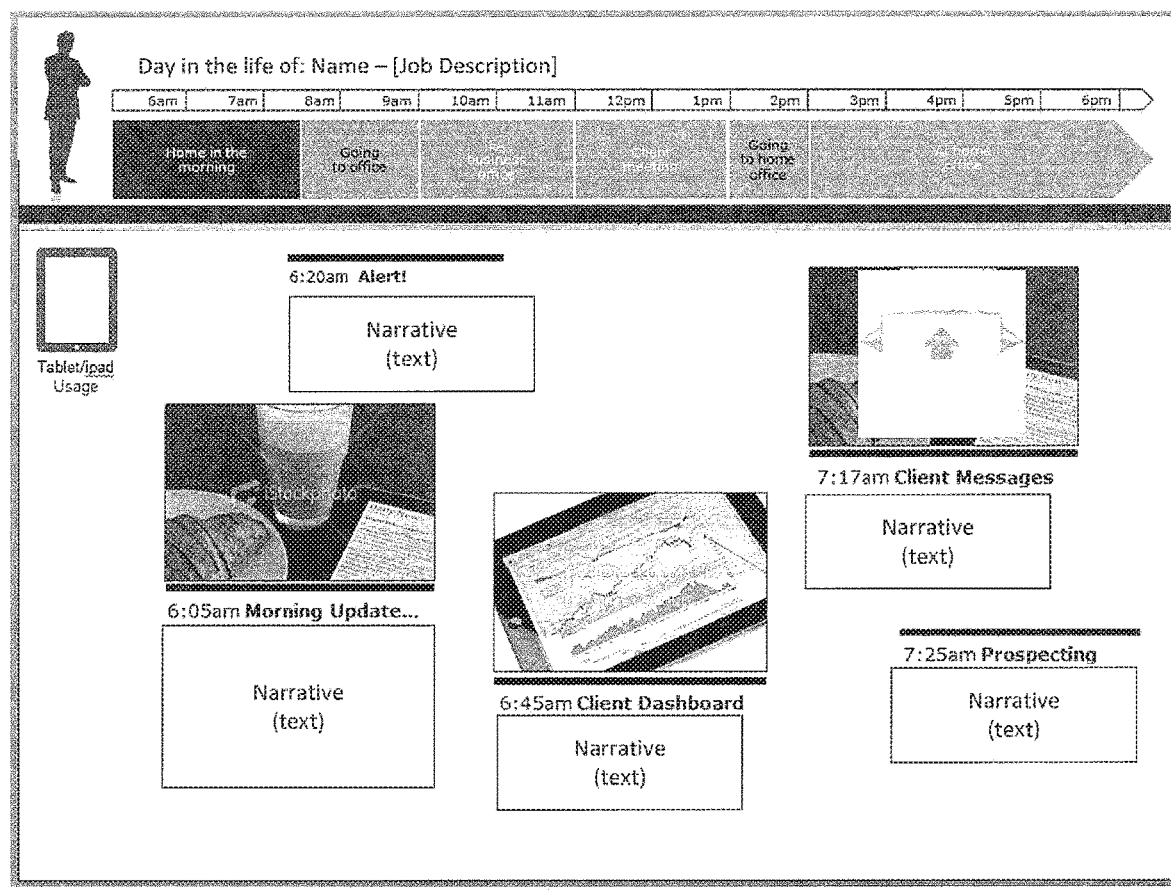
FIGS. 16A-C show a day-in-the-life output of the output generator.
Figure 16B:
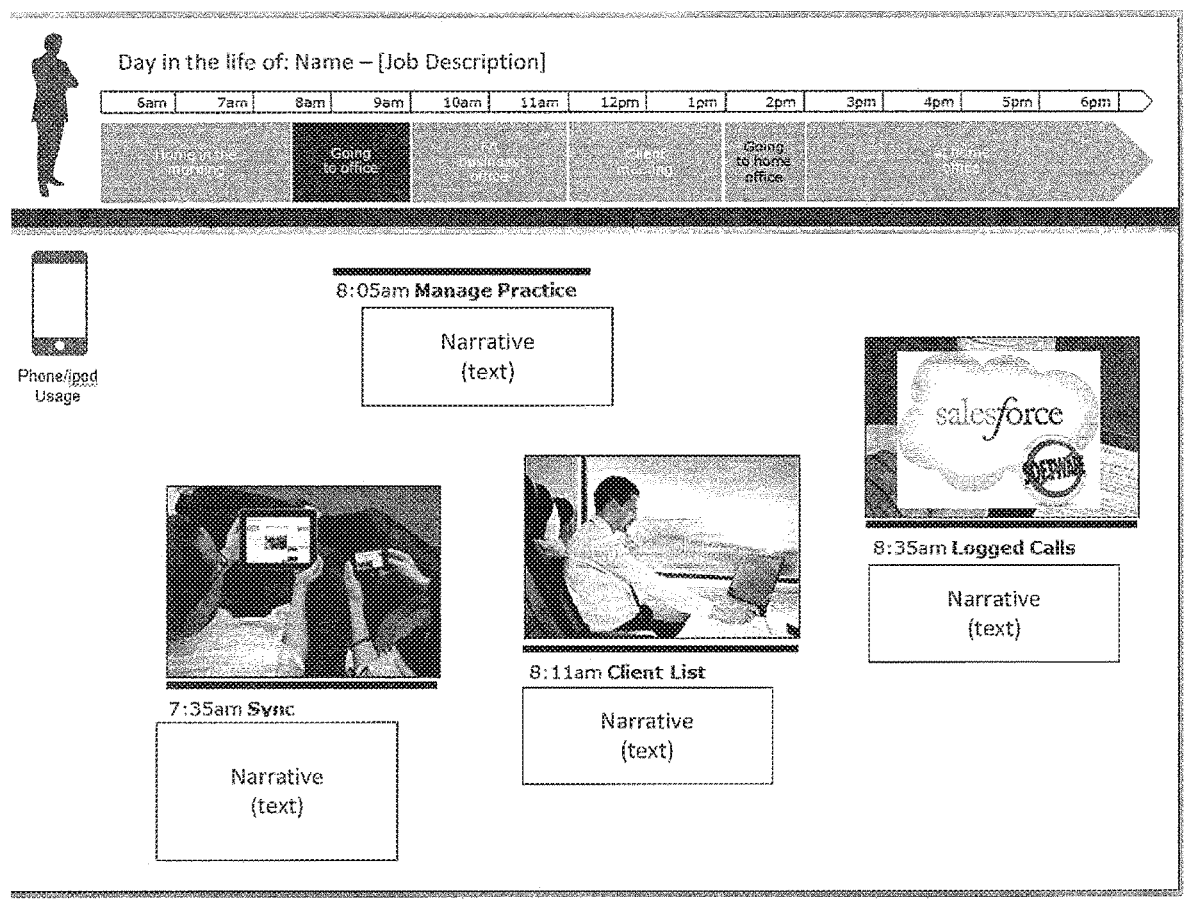
Figure 16C:
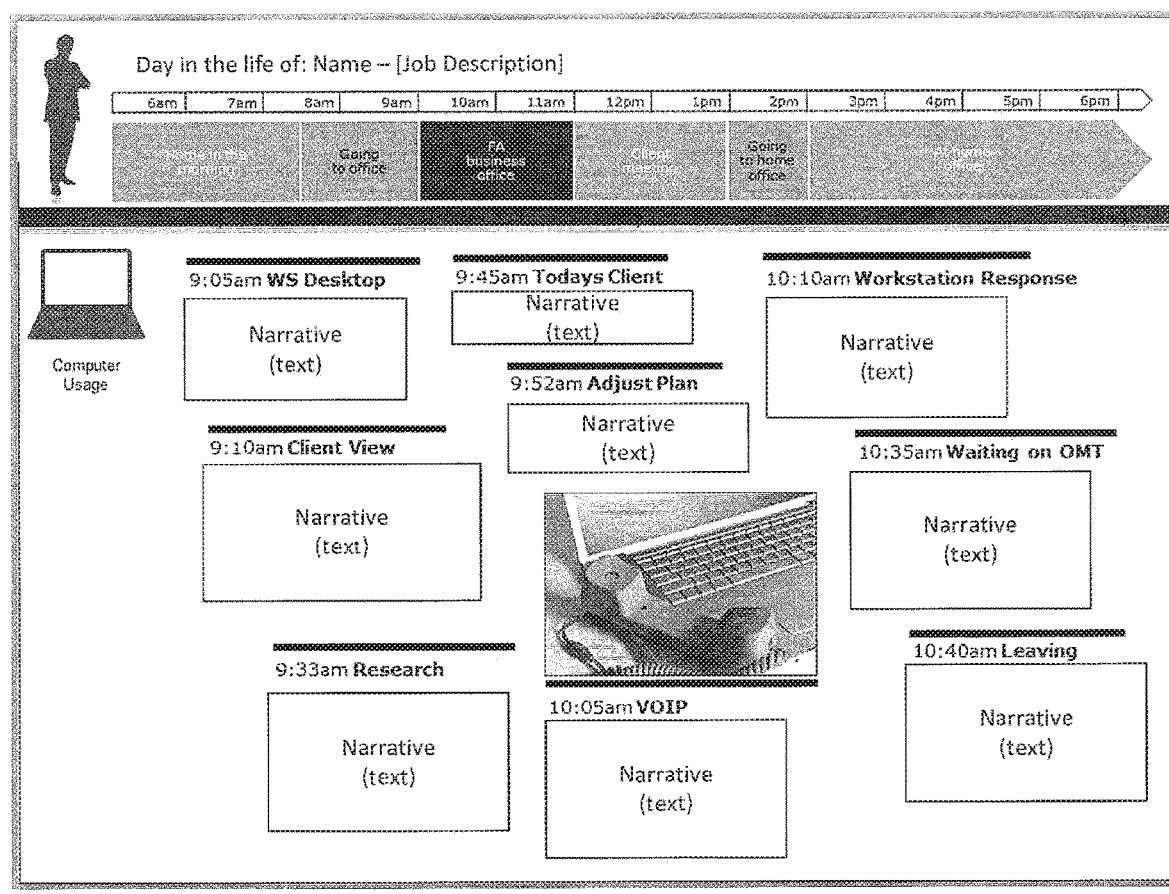
Figure 17:
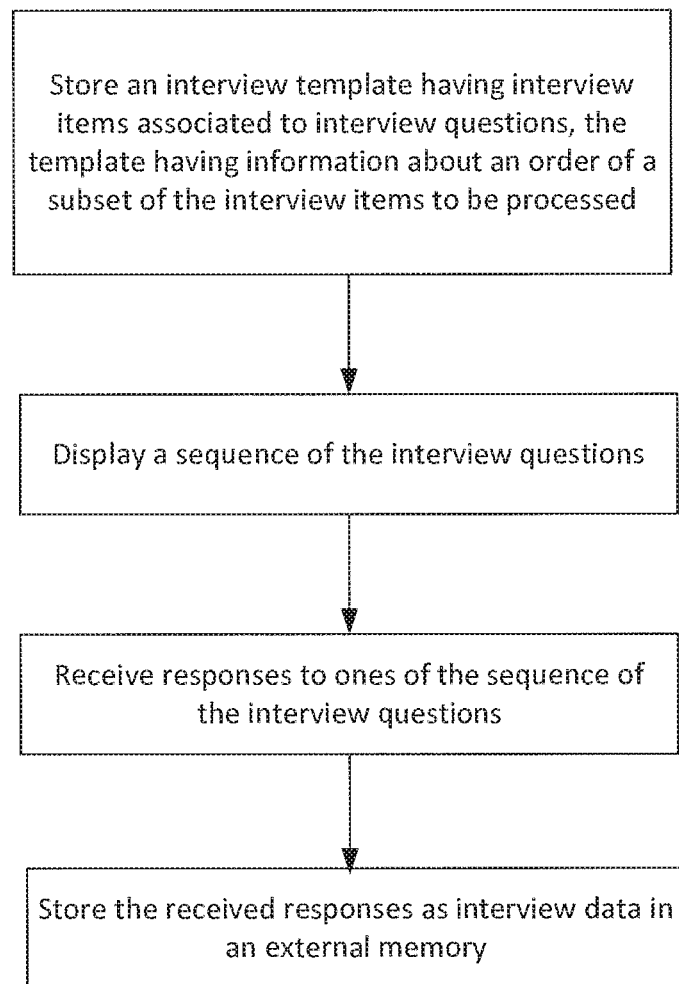
FIG. 17 is a flowchart illustrating an operation of the interview capture tool of FIG. 1.

FIGS. 16A-C show a day-in-the-life output of the output generator. The day-in-the-life output provides an expanded report having a full story incorporated into the report based upon the persona and scenario. As shown, the report is structure chronologically and has events populating the timeline to indicate activity, type of interaction (system or people), the location, etc.

For example, a "trading card" may be a printed form approximately the size of a sports trading card (such as a baseball card) that contains only the most relevant information about a persona. Progressively larger printed forms ("one-sheet summary," "detailed research form," "side-by-side comparison," "table-size cutout" and "life-size cutout") contain progressively more information about the persona. Other numbers and sizes of printed outputs may be used.

Analyzer

The analyzer 122 (FIG. 1) uses personas 112 and scenarios 118 to evaluate a system 120 and generate one or more benchmarking reports about usability and the user experience of the system 120. As noted, the system 120 may be one that was designed, at least in part, to service users who are at least thought to be represented by the personas 112 and who are at least thought to perform the scenarios 118.

The analyzer 122 provides several user input sections to accept a numerical feedback from the user based upon the user's assessment of the use system 120. The various user input sections may include a performance score section and a persona score section.

In some embodiments, the analyzer 122 performs a static analysis of a user interface provided by the system 120. The analyzer 122 parses the user interface to ascertain locations of user inputs, numbers of user inputs, lengths of prompts and help messages, numbers of links that must be followed to complete transactions, and the like. The analyzer 122 compares this information to aspects of personas that are expected to use the user interfaces. For example, the analyzer 122 may compare the number of links that must be followed to complete a transaction to a persona metric that indicates patience of the persona or the maximum number of clicks the persona is likely to tolerate before abandoning a web-based transaction. Similarly, the analyzer 122 may consider information in a scenario 118. For example, if the analyzer 122 is analyzing a travel e-commerce web site in the context of a "busy business person" persona performing a "one-day opposite coast business trip" scenario, one of the scenario requirements may specify a maximum number of clicks.

In other embodiments, the analyzer 122 performs a dynamic analysis of the user interface provided by the system 120. The user interface is instrumented to send data to the analyzer 122 as users interact with the user interface or thereafter. The use information may include amount of time spent on specified pages or fields within the user interface, whether the user abandoned a transaction before completing it, number of fields filled in, etc. If information about the users, such as information that may be used to categorize the users according to the personas 112, is available to the system 120, this information may be sent to the analyzer 122 in association with use information. Thus, the analyzer may ascertain which, if any, of the personas 112 individual users of the system 120 are similar to, within predefined limits. For example, the analyzer 122 may use the information provided by the system 120 to measure number of clicks a user made to complete (or before abandoning) a transaction and compare this number to a persona or a scenario metric that indicates patience of the persona or the maximum number of clicks the persona is likely to tolerate before abandoning a web-based transaction.

The usability report 124 may be for several personas (Mike, Betty and Jim) performing several scenarios (Create an account, Simple order, Change shipping, etc.).

The analyzer 122 may include an input to receive a description of a graphical computer user interface (GUI), an input to receive a description of a persona representing an intended user of the user interface and an analysis engine that rates the user interfaces expected "user experience quality," based on the description of the persona.

A persona/scenario monitor/tuner (not shown) may dynamically and/or automatically adjust a persona 112 or a scenario 118, based on actual user behavior of the system 120. In one embodiment, a closed-loop modeler/tuner includes an input and translation interface to receive activity data from a system 120 and associate user-driven site activity with expected behavior. A comparison engine in the modeler/tuner compares the expected behavior with the actual behavior at the web site and automatically updates the performance metrics of the appropriate stored persona/scenario, based on differences between the expected and actual behavior. Specific behaviors that are analyzed may include device actions, such as mouse clicks on interactive web page controls, keyboard actions such as entering data into forms, and aggregated patterns of these interactions across web pages.

Integrated Tools

Referring back to FIG. 1, the Market Segment Modeler, the Persona Modeler, and the Scenario Modeler may be incorporated to form an integrated tool. The integrated tool may have core services. Core Services are modules that enable consistent operational functions across all the modeling tools. The underlying data repository supports the storage of all assets created with the modeling tools, including, research collection templates, study data, participant data and research artifacts, segment analytics, affinity analytics, saved models, saved output templates, saved model outputs and saved reports.

The system may further comprise a collaboration service tool that enables a multi-disciplinary team to work together on the research, design, and development required to create and continuously improve a software application. The collection and analysis of user feedback provides the mechanism to continuously validate and refine market, persona, and scenario models over time.

The system may further comprise a data importer, the research template and template editor, a research data collection module, a data analytic module, a data consolidation module, a data visualization module, a data output module, and an administration module.

The data importer allows for the importing of legacy data in a variety of database formats. The research templates and template editor form the basis for all data collection. The research template may include, in part, the interview template and editor. The template editor allows a user to create structured collection forms that serve research collection.

The research data collection module allows users to capture audio and take notes during a user interview session. The user can classify the notes taken in real time against the research template they have created within the modeling tools. The research data collection module may include, in part, the interview capture tool.

The data analytics module provides underlying code to analyze structured and unstructured data sets via descriptive statistics, qualitative analysis and affinity analysis. The module may further allow for data shaping to convert unstructured data to structured data for use in the affinity exploration. The data consolidation module stores interview data stored across studies and modules (e.g. survey research and interview research. The data visualization: module consolidates data can be rendered visually using common charting and visualization tools. The data output module supports output of a variety of types including: one-sheets, two-sheets, three-sheets, trading cards, chart, poster and life-size cutouts. The administration module provides for permission control, secure access, and administration of licenses to manage enterprise level user bases.

Collaboration Tool

Another embodiment is a tool that allows a team of people to collaborate on the design and development of software applications. A software application may be, for example, an e-commerce or other web site having a conventional web-based user interface, a stand-alone application program for execution on a personal computer that includes a user interface or a single-purpose computer system that includes a user interface. In any case, the user interface may include one or more "pages" or similarly divided groups of user interface components, such as buttons, text boxes, pull-down lists, radio buttons and the like. As used herein, the term "portion" of a user interface refers to any one or more user interface components, such as a single button, a group of components on a single page, a whole page or a group of pages.

The tool acts as an online "hub" which provides a repository and focus for all documents, artifacts and related review feedback for the application design and development process. The data in the repository may, but need not, be stored in persistent memory. Persistent means lasting even after the computer program stops running, such as being stored in a database.

The process begins with the identification of a project. In this tool, which works as a part of a suite of related tools, "projects" are entities that are connected to Personas created in other tools in the suite and "Scenarios" which those Personas perform. The tool allows Interaction Designers (also known as Interface Designers or User Interface Architects) to upload designs which address the needs of specific Scenarios related to specific Personas. These design artifacts, created by this participant, are often called wireframes. Once the wireframes have been uploaded to the hub, other team members in the wider cross-disciplinary team can access and review the documents and leave targeted comments in the hub. The original author of the wireframes can then factor in comments made by other team members and uploaded revised wireframes to address the issues raised in the comments. The hub will also incorporate a workflow mechanism such that design artifacts can be "approved" or "signed off upon" by appropriate stakeholders which are part of the wider cross-disciplinary team. The next phase forward in the workflow supported by the hub tool is visual design. Once the wireframes are approved, a visual designer can start working on visual designs based on the, usually black and white, approved wireframes.

Figure 19:
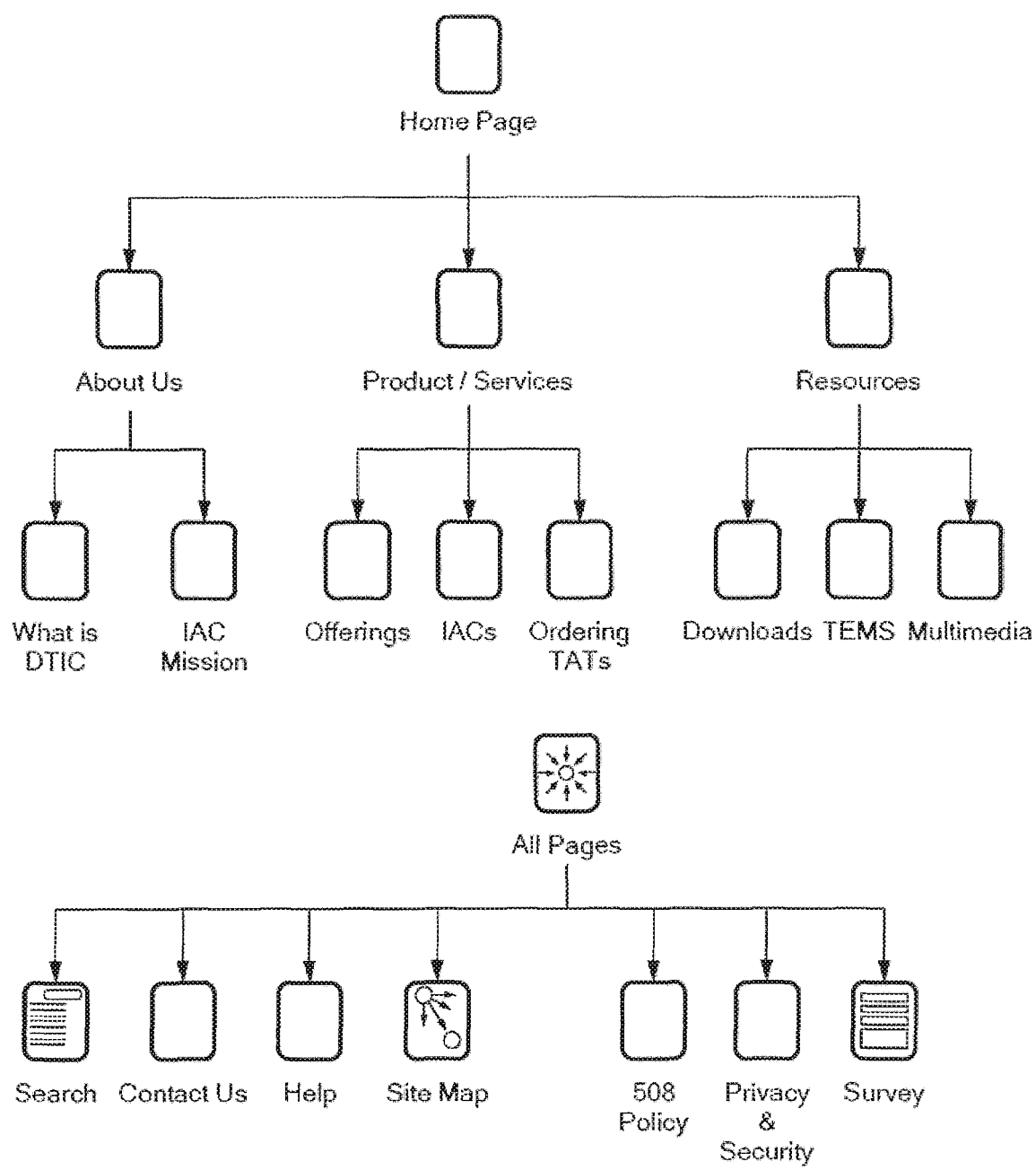
FIG. 19 schematically shows nodes of a tree of FIG. 20.
Figure 20:
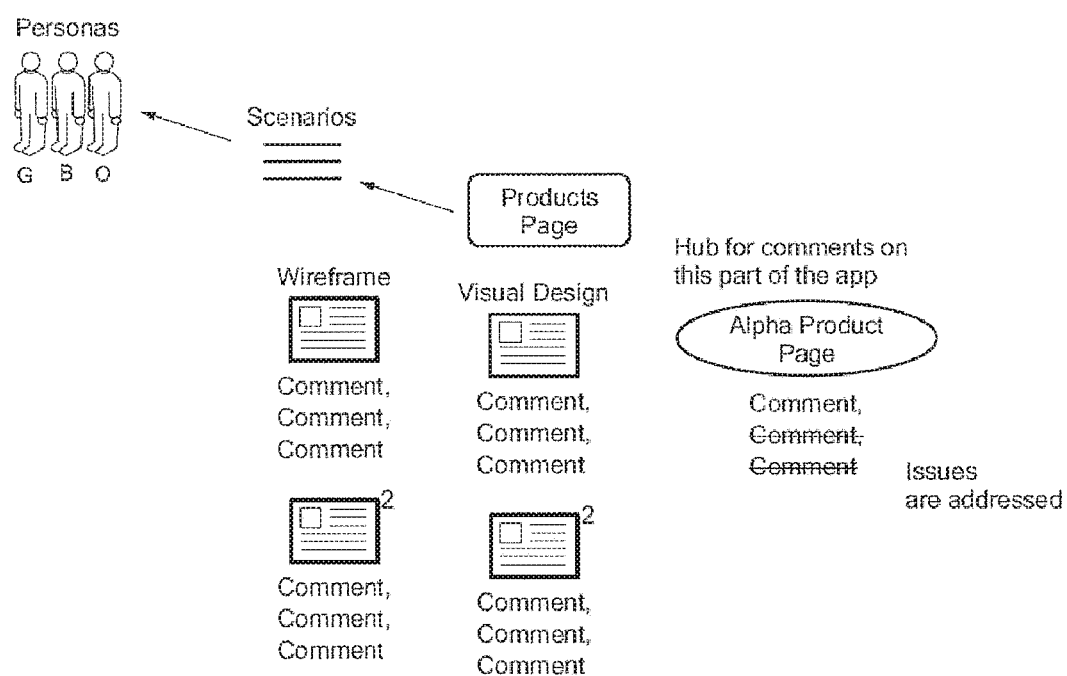
FIG. 20 schematically shows provenance of the personas and scenario from the nodes of the tree according to an illustrative embodiment.

FIG. 19 schematically shows the wireframes of a computer software interface. When the first draft of these visual designs is complete, the visual designer can upload them to the same section of the hub tool that housed the related wireframes. Each of these parts of the project can be considered to be "nodes" of the application that is being designed. For example, each node may correspond to a portion of a user interface. The hub has a "node" for each proposed node in the resulting final software application. For example, as shown schematically in FIG. 19, a web site may include a number of web pages arranged hierarchically, beginning with a home page at the top of the tree, and including a node for each page to which a user can navigate from the home page, and so forth down the web page hierarchy. In some computer applications, one of the first portions a user interacts with solicits user identification, such as by requesting or requiring entry of user identification and possibly a password. Once a user has been identified, some such applications store information on the user's computer (such as a "cookie") to identify the user during subsequent invocations of the application, without the user again explicitly identifying himself/herself. Thus, a computer application can explicitly identify a user (such as via a username) or implicitly identify a user (such as via a cookie). Once the user has been identified, the computer application can ascertain from database information about the user, such as the user's address, preferred credit card, a persona that exemplifies the user, a scenario that the user is likely to perform, and the like.

Once the visual designer uploads their visual designs to the appropriate node, other team members in the wider team can provide feedback on these designs in the same manner that they did for the uploaded wireframes. The visual designer can then create revised designs based on the feedback and then upload the new designs to the node. When these visual designs are approved by the appropriate stakeholders, the next part of the process can begin.

Ideally, designers design user-interfaces for specific personas and/or for specific scenarios. For example, in FIG. 19, the left-most sub-tree (beginning with "About Us") may represent web pages that are expected to be viewed by a particular persona (ex., "First-time users"), whereas the central sub-tree (beginning with "Product/Service") may be expected to be viewed by a different persona (ex., "Buyers"), and the design of each sub-tree's web pages may be tailored for its respective persona. Similarly, portions of the tree may represent portions of the web site expected to be used during the performance of various scenarios. During a design phase, each node in the tree has information added to it to indicate the persona(s) and scenario(s) associate with the node. The collaboration tool is configured to receive information describing nodes that are to be added to the tree, including the associated persona and/or scenario, and the tool creates appropriate nodes and links them into the tree, which may be stored, for example, in a computer file or electronic database.

The collaboration tool may include a port configured to read information from a persona database, such as provenance information about personas, and store the provenance information in nodes of the tree that are associated with the personas. The tool may display the provenance information if a user performs a particular gesture on a graphical user interface (GUI), such as hovering a mouse pointer over a portion of the GUI that currently displays information about a node of the tree, right-clicking the portion of the GUI, or any other appropriate gesture.

The next step forward in the hub tool hosted workflow is the development process. Development artifacts can be linked to the tool in a variety of ways. This may be done in the hub tool by linking to code hosted on a different server. The presentation layer of that code may be linked so that that it is viewed directly in-line with the hub tool display itself, or the actual code of the fully running application with links to presentation layer, logic layer, and back-end data layer may be running in concert in a display presented in-line with the hub tool presentation layer. The end result of the above linkage to final or presentation layer coded versions of the application is to provide the wider multi-disciplinary team with the ability to provide feedback on the working, coded version of the application as it is being built so that fixes and adjustments can be made by the developers and possibly by designers involved with earlier stages of the process. If a new wireframe is needed to support an unanticipated need, the Interaction Designer will upload a new wireframe to the appropriate node or a newly created node. In a similar fashion, a visual designer will create a wireframe based on the new wireframe.

Eventually, the application will be fully developed and linked within the hub tool. At this point the team may enter a Quality Assurance (QA) phase. Comments from the QA tester can go against the same nodes and may trigger required responses from all of the designers and developers who participated earlier in the process. The collaboration tool may receive comments from designers and others, along with identifications of which nodes the comments relate to, and store the comments, in association with the corresponding nodes. For example, the comments may describe a usability problem identified during usability testing or merely foreseen by thoughtful designers.

Eventually, the application will be released to its end users. At this point feedback may come in from End Users regarding the design and functioning aspects of the application. The node hierarchy embodied in the hub tool is a natural place to store this new feedback provided by end users. When this new feedback arrives in the tool, the cross-disciplinary team responsible for the ongoing design and development of the tool will make comments and prioritize which items need to be addressed in which order. Workflow related to these tasks will also be supported and hosted in the hub tool, and the re-design and development related with improvements to each node will be carried out in the same fashion as described above.

Similar to end-user feedback derived from a variety of end-user self-service channels, feedback on the released application will be generated by Usability Tests performed by the wider cross-disciplinary team. Feedback from these tests can be attached to the appropriate nodes in the hub tool.

Another form of feedback that may be stored in nodes of the hub tool includes items derived from automated systems monitoring the live released application. Automated systems that watch the performance of a running application and detect problems with user flow through the tool can create automated messages that can be targeted as inputs to specific parts of the tool. Such messages are referred to herein generically as "usability problem reports." Exemplary systems that generate usability problem reports are available from Tealeaf Technology, Inc., San Francisco, Calif. 94105 and MediaMetrix from comScore, Inc. Typically, a usability problem report is an electronic message that includes an identification (such as a "page ID") of a portion of a user interface of a computer application where a user is experiencing or has experienced a usability issue, such as circulating among a small number of web pages, abandoning a transaction, spending excessive time on a particular text box, clicking a "help" button, etc. The hub tool can receive these usability problem reports and locate nodes in the tree that correspond to the portion of the computer application identified in the reports. As a preliminary matter, the tree should be augmented to include page IDs (or other appropriate identifications) of the portions of the user interface. This may be accomplished by, for example, automatically crawling the user interface and soliciting a page ID from each page visited. In alternative embodiments, the hub tool may receive consumer identifier based on system cookies.

Problematically, the various systems available for automatically generating the usability problem reports provide information in incompatible formats. For example, each such system may identify the portion of the user interface at issue using a different identification scheme. The hub, and in particular the node tree, provides a standard reference for a user interface. Once the tree nodes have been augmented to include the identifications used by the various usability problem reporting systems, either automatically such as by crawling, manually or by a combination of automatic and manual methods, when such a report is received by the hub tool, the hub tool can aggregate the reports in the nodes of the tree. For example, each node may include a counter, and the hub tool may increment the counter whenever a usability report is received that implicates the portion of the user interface represented by the node. Furthermore, this usability problem data may be accessed according to persona or scenario. That is, in response to a user request for problem information about a particular persona or scenario, the hub tool can locate all nodes that correspond to the persona or scenario and display a count of problems for each such node or a total count of problems for all such nodes.

Another form of feedback that can be stored in the hub tool nodes are messages generated by help desk representatives assigned to answer phone calls, online chats, and emails from end users having problems as they try to use the application. Help desk personnel can tag tickets in their system, which are then sent into the hub tool and logged as feedback against the appropriate nodes in the tool.

Measurement inside the hub tool. The hub tool is, in some ways a feedback or issue management tool in which each comment assigned to a node is a kind of issue. Feedback items can be classified as different types of issues and also can be identified as possessing different levels of severity or priority and these can be measured over time. A display showing the number, severity, and nature of different issues logged against each node of the application can be viewed in dashboard displays inside the hub tool and the user can monitor the current status of parent as well as child nodes as well has view historical views of issue counts and severity over time to assess trends in the health of those parts of the application.

Several tools (including an interview capture tool, persona modeler, market segment modeler, collaboration tool, scenario modeler and computer application usability reporting utility) have been described. Each of these tools can be implanted by a processor controlled by instructions stored in a memory. The processor may operate based on a control program including, in part, instructions stored in a memory to be operated upon by the processor. The memory may be random access memory (RAM), read-only memory (ROM), flash memory or any other memory, or combination thereof, suitable for storing control software or other instructions and data. Some of the functions performed by the tools have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g.

read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of tools have been described with reference to a flowchart, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as being limited to the disclosed embodiment(s).

What is claimed is:

1. A collaboration tool, comprising:
   a memory configured to store a plurality of nodes of a tree, the tree representing a user interface of a computer application, wherein each node from the plurality of nodes corresponds to a respective portion of the user interface; and
   a control program configured to:
      control the memory;
      receive a user input that describes a new portion that is to be added to the user interface;
      insert a node in the tree corresponding to the new portion;
      receive a user input that identifies a persona, a scenario related to the persona, and a portion of the user interface, wherein the persona is a data model that represents a fictitious person with a defined set of characteristic attributes comprising a psychometric test metric, and wherein the scenario describes what the at least one persona does, where the at least one persona performs activities and under what circumstances; and
      store an identification of the persona in the memory and associate the stored persona identification with a node that corresponds to the identified portion of the user interface.

2. A collaboration tool according to claim 1, further comprising:
   a port configured to access a persona database that includes provenance data associated with at least one persona represented in the persona database;
   wherein the control program is configured to:
      read, from the persona database, via the port, provenance data associated with a persona that is associated with a node in the tree;
      store the read provenance data in the memory and associate the stored provenance data with the node in the tree; and
      in response to a user performing a predetermined gesture on a graphical user interface of the collaboration tool, proximate where information about a node of the tree is displayed, display provenance of information about a persona associated with the node whose information is displayed.

3. A collaboration tool according to claim 1, wherein the control program is configured to:
   store an identification of the scenario in the memory and associate the stored scenario identification with the node that corresponds with the identified portion of the user interface.

4. A collaboration tool according to claim 1, wherein the control program is configured to:
   receive a user input that includes a comment and that identifies a portion of the user interface; and
   store the comment in the memory and associate the stored comment with the node that corresponds with the identified portion of the user interface.

5. A computer-implemented method for facilitating collaboration among a plurality of user interface designers, the method comprising:
   accessing a persona database that includes provenance data associated with at least one persona represented in the persona database and a scenario related to the at least one persona, wherein the at least one persona is a data model that represents a fictitious person with a defined set of characteristic attributes comprising a psychometric test metric, and wherein the scenario describes what the at least one persona does, where the at least one persona performs activities and under what circumstances;
   reading, from the persona database, provenance data associated with a persona that is associated with a node in the tree;
   storing the read provenance data in a memory and associating the stored provenance data with the node in the tree; and
   in response to a user performing a predetermined gesture on a graphical user interface of a collaboration tool, proximate where information about a node of the tree is displayed, displaying provenance of information about a persona associated with the node whose information is displayed.

6. A method according to claim 5, further comprising:
   storing an identification of the scenario in the memory and associating the stored scenario identification with the node that corresponds with the identified portion of the user interface.

7. A method according to claim 5, further comprising:
   receiving a user input that includes a comment and that identifies a portion of the user interface; and
   storing the comment in the memory and associating the stored comment with the node that corresponds with the identified portion of the user interface.

8. A computer program product for facilitating collaboration among a plurality of user interface designers, the computer program product comprising a non-transitory computer-readable medium having computer readable program code stored thereon, the computer readable program code configured to:

access a persona database that includes provenance data associated with at least one persona represented in the persona database and a scenario related to the at least one persona, wherein the at least one persona is a data model that represents a fictitious person with a defined set of characteristic attributes and the scenario describes what the at least one persona does, where the at least one persona performs activities and under what circumstances;

read, from the persona database, provenance data associated with a persona that is associated with a node in the tree;

store the read provenance data in a memory and associating the stored provenance data with the node in the tree; and in response to a user performing a predetermined gesture on a graphical user interface of a collaboration tool, proximate where information about a node of the tree is displayed, display provenance of information about a persona associated with the node whose information is displayed.

9. A collaboration tool according to claim 1, wherein the hierarchically organized data are grouped or indexed by categories and sub-categories.

10. A collaboration tool according to claim 1, wherein the hierarchically organized data comprises psychographic class data and specific psychographic class data.

11. A collaboration tool according to claim 10, wherein each of the psychographic class data and the special psychographic class data comprises one or more discrete categories having one or more subcategories.

* * * * *